(12) United States Patent
Khan et al.

(10) Patent No.: US 11,115,814 B2
(45) Date of Patent: Sep. 7, 2021

(54) USE OF ENCRYPTION TO PROVIDE POSITIONING SUPPORT SERVICES

(71) Applicant: HERE GLOBAL B.V., Eindhoven (NL)

(72) Inventors: Muhammad Irshan Khan, Tampere (FI); Jari Syrjärinne, Tampere (FI); Pavel Ivanov, Tampere (FI)

(73) Assignee: HERE GLOBAL B.V., Eindhoven (NL)

( * ) Notice: Subject to any disclaimer, the term of this patent is extended or adjusted under 35 U.S.C. 154(b) by 180 days.

(21) Appl. No.: 15/739,619

(22) PCT Filed: Jun. 29, 2015

(86) PCT No.: PCT/EP2015/064631
§ 371 (c)(1),
(2) Date: Dec. 22, 2017

(87) PCT Pub. No.: WO2017/000975
PCT Pub. Date: Jan. 5, 2017

(65) Prior Publication Data
US 2018/0184287 A1 Jun. 28, 2018

(51) Int. Cl.
*H04W 12/02* (2009.01)
*G01S 5/02* (2010.01)
(Continued)

(52) U.S. Cl.
CPC ............... *H04W 12/02* (2013.01); *G01S 1/04* (2013.01); *G01S 5/02* (2013.01); *G01S 5/0236* (2013.01);
(Continued)

(58) Field of Classification Search
CPC .......... H04W 12/02; H04W 12/00503; H04W 64/003; G01S 1/04; G01S 5/02;
(Continued)

(56) References Cited

U.S. PATENT DOCUMENTS 6,782,264 B2 * 8/2004 Anderson ................. G01S 5/02
455/456.1
6,948,062 B1 * 9/2005 Clapper ................ H04L 9/0872
713/162

(Continued)

FOREIGN PATENT DOCUMENTS

CN 204129214 U * 1/2015

OTHER PUBLICATIONS

Ling Pei, Using Inquiry-based Bluetooth RSSI probability Distributions for Indoor Positioning, 2010, , Journal of Global Positioning System, vol. 9, No. 1, pp. 122-130. (Year: 2010).*

(Continued)

*Primary Examiner* — Shahriar Zarrineh
(74) *Attorney, Agent, or Firm* — Alston & Bird LLP

(57) ABSTRACT

A method is disclosed, comprising: holding available, by a first apparatus, encrypted first positioning support data, wherein said encrypted first positioning support data are decryptable by a first decryption key, and wherein said encrypted first positioning support data are configured to enable one or more mobile devices receiving said encrypted first positioning support data and having access to said first decryption key to determine their position at least partially based on said first positioning support data; and automatically and repeatedly sending or triggering sending, by said first apparatus, said encrypted first positioning support data.

22 Claims, 6 Drawing Sheets

(51) Int. Cl.
*G01S 1/04* (2006.01)
*H04L 9/08* (2006.01)
*H04L 9/14* (2006.01)
*G01S 1/68* (2006.01)
*H04W 64/00* (2009.01)
*H04W 12/63* (2021.01)

(52) U.S. Cl.
CPC .......... *G01S 5/0252* (2013.01); *H04L 9/0816* (2013.01); *H04L 9/14* (2013.01); *G01S 1/68* (2013.01); *H04W 12/63* (2021.01); *H04W 64/00* (2013.01); *H04W 64/003* (2013.01)

(58) Field of Classification Search
CPC ........ G01S 5/0236; G01S 5/0252; G01S 1/68; H04L 9/0816; H04L 9/14
USPC .......................................................... 713/168
See application file for complete search history.

(56) References Cited

U.S. PATENT DOCUMENTS

| | | | | |
|---|---|---|---|---|
| 7,159,112 | B1* | 1/2007 | Williams | G06F 21/84 380/54 |
| 8,166,292 | B2* | 4/2012 | Qiu | H04N 7/52 713/150 |
| 8,838,139 | B2* | 9/2014 | Anderson | H04W 64/00 455/456.1 |
| 9,059,974 | B2* | 6/2015 | Kim | G06F 21/6281 |
| 9,065,908 | B2* | 6/2015 | Buer | H04W 12/02 |
| 9,794,753 | B1* | 10/2017 | Stitt | H04B 17/318 |
| 9,810,764 | B2* | 11/2017 | Shaw | H04W 64/006 |
| 9,813,854 | B2* | 11/2017 | Jin | H04W 4/04 |
| 2002/0016169 | A1* | 2/2002 | Sykes | H04W 8/183 455/456.1 |
| 2002/0149515 | A1* | 10/2002 | Alanen | G01S 19/42 342/357.25 |
| 2004/0218574 | A1* | 11/2004 | Sata | H04L 67/16 370/338 |
| 2005/0255892 | A1* | 11/2005 | Wong | H04B 7/2606 455/562.1 |
| 2007/0017312 | A1* | 1/2007 | Yone | F16H 59/0204 74/335 |
| 2008/0045235 | A1* | 2/2008 | Kennedy | G01S 5/14 455/456.1 |
| 2008/0122690 | A1* | 5/2008 | Wan | G01S 19/05 342/357.42 |
| 2008/0209521 | A1* | 8/2008 | Malaney | H04L 63/10 726/4 |
| 2008/0252527 | A1* | 10/2008 | Garcia | G01S 1/68 342/450 |
| 2009/0082032 | A1* | 3/2009 | Selgert | H04W 8/10 455/456.1 |
| 2009/0220093 | A1* | 9/2009 | Hodges | H04N 1/00212 380/278 |
| 2010/0259450 | A1* | 10/2010 | Kainulainen | G01S 5/02 342/417 |
| 2010/0309057 | A1* | 12/2010 | Edge | G01S 5/0236 342/451 |
| 2011/0043373 | A1* | 2/2011 | Best | G01S 1/68 340/8.1 |
| 2011/0282697 | A1* | 11/2011 | Fitzgerald | G06Q 40/08 705/4 |
| 2011/0305337 | A1* | 12/2011 | Devol | H04W 12/003 380/259 |
| 2012/0021762 | A1* | 1/2012 | Garin | G01C 21/206 455/456.1 |
| 2012/0106738 | A1* | 5/2012 | Belenkiy | H04L 9/0872 380/270 |
| 2012/0122421 | A1* | 5/2012 | Proietti | H04W 12/02 455/410 |
| 2012/0225663 | A1* | 9/2012 | Gupta | G01S 5/0063 455/456.1 |
| 2012/0324228 | A1* | 12/2012 | Padhye | H04L 9/3226 713/176 |
| 2013/0029685 | A1* | 1/2013 | Moshfeghi | G01S 19/48 455/456.1 |
| 2013/0065585 | A1* | 3/2013 | Pelletier | G06Q 30/0267 455/435.1 |
| 2013/0225222 | A1* | 8/2013 | Ma | H01Q 3/26 455/517 |
| 2013/0252583 | A1* | 9/2013 | Brown | H04L 63/0807 455/411 |
| 2013/0324154 | A1* | 12/2013 | Raghupathy | G01S 19/10 455/456.1 |
| 2014/0018059 | A1* | 1/2014 | Noonan | H04W 4/021 455/419 |
| 2014/0082369 | A1* | 3/2014 | Waclawsky | G06F 21/62 713/189 |
| 2014/0104291 | A1* | 4/2014 | Rutz | H04W 24/04 345/589 |
| 2014/0228044 | A1 | 8/2014 | Jones, Jr. | |
| 2014/0331045 | A1* | 11/2014 | Segev | H04L 63/0428 713/168 |
| 2015/0241548 | A1* | 8/2015 | Jones | G01S 5/0231 455/456.1 |
| 2015/0289133 | A1* | 10/2015 | Qin | H04W 12/02 380/270 |
| 2016/0078698 | A1* | 3/2016 | Moses | G08B 25/14 340/5.23 |
| 2016/0094947 | A1* | 3/2016 | Shen | H04W 4/023 455/456.1 |
| 2016/0157099 | A1* | 6/2016 | Schatzberg | H04W 12/02 380/270 |
| 2016/0161592 | A1 | 6/2016 | Wirola et al. | |
| 2016/0212582 | A1* | 7/2016 | Jin | H04W 4/04 |
| 2016/0316419 | A1* | 10/2016 | Shyamalan | H04W 8/005 |
| 2017/0264438 | A1* | 9/2017 | Kirshenbaum | H04L 9/0872 |
| 2018/0184287 | A1* | 6/2018 | Khan | G01S 5/02 |
| 2018/0199190 | A1* | 7/2018 | Khan | H04L 63/0428 |
| 2018/0219869 | A1* | 8/2018 | Kumar | H04W 12/12 |
| 2018/0288728 | A1* | 10/2018 | Berkovich | G01S 19/24 |

OTHER PUBLICATIONS

El-Badry, R. et al., *Hidden Anchor: Providing Physical Layer Location Privacy in Hybrid Wireless Sensor Networks* [online][retrieved Mar. 1, 2018]. Retrieved from the Internet: <URL: http://wrc-ejust.org/wp-content/uploads/Hidden_Anchor_ntms.pdf>. 5 pages.

International Search Report and Written Opinion for corresponding International Application No. PCT/EP2015/064631, dated Aug. 14, 2015, 11 pages.

Menezes, A. et al., *Handbook of Applied Cryptography*, CRC Press, Jan. 1, 1997, (online) [retrieved Mar. 19, 2018]. Retrieved from the Internet: <URL: http://cacr.uwaterloo.ca/hac/>. 547-550.

Poovendran, R. et al., *SeRLoc: Secure Range-Independent Localization for Wireless Sensor Networks*, WiSe '04, Proceedings of the 3rd ACM (2004) 21-30.

*Specification of the Bluetooth System*, Covered Core Package version: 4.2, Bluetooth SIG, (Dec. 2, 2014) vol. 1, Part A, Architecture, chapter 1.2, pp. 16-17.

*Specification of the Bluetooth System*, Covered Core Package version: 4.2, Bluetooth SIG, (Dec. 2, 2014) vol. 1, Part A, Architecture, chapter 3.3.2.2, pp. 54-55.

*Specification of the Bluetooth System*, Covered Core Package version: 4.2, Bluetooth SIG, vol. 6, Part B, Link Layer Specification, Chapters 2.1-2.3, pp. 38-42, 54-55.

Zhang et al., *A Signcryption-based Secure Localization Scheme in Wireless Sensor Networks*, Physics Procedia, vol. 33 (2012) 258-264.

Intention to Grant European Application No. 15 732 657.0 dated Jan. 4, 2019, 5 pages.

Intention to Grant European Application No. 15 732 657.0 dated Jul. 18, 2019, 5 pages.

\* cited by examiner

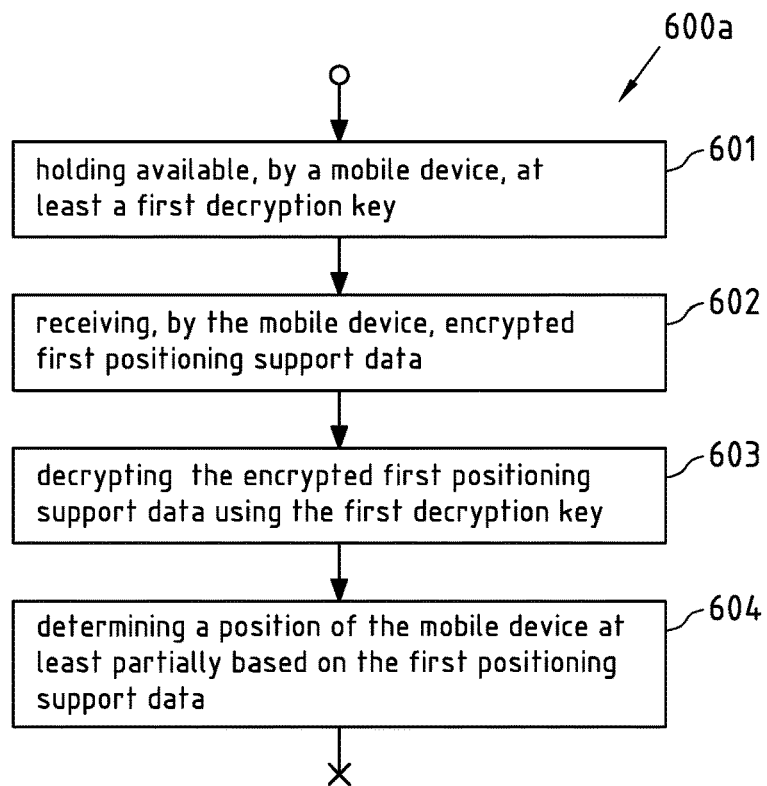
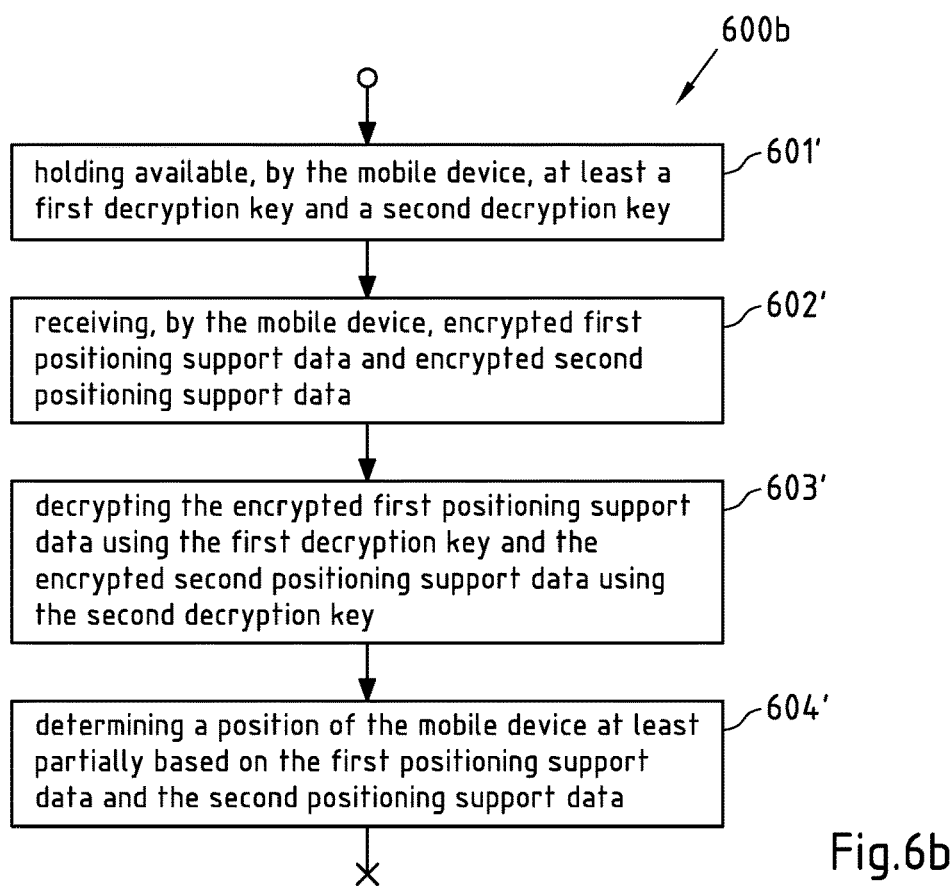

USE OF ENCRYPTION TO PROVIDE POSITIONING SUPPORT SERVICES

FIELD OF THE DISCLOSURE

The invention relates to the field of positioning and more specifically to the use of encryption to provide positioning support services.

BACKGROUND

Satellite signal based positioning technologies, which are mainly used outdoors, are usually not suited to deliver a satisfactory performance when used for indoor positioning, since satellite signals of global navigation satellite systems (GNSS), like the global positioning system (GPS), do not penetrate through walls and roofs strongly enough for an adequate signal reception indoors. Thus, these positioning technologies are not able to deliver a performance indoors that would enable seamless, equal and accurate navigation experience outdoors and indoors.

Therefore, several dedicated solutions for indoor positioning have been developed and commercially deployed during the past years. Examples comprise solutions that are based on pseudolites, which are ground based GPS-like short-range beacons, ultra-sound positioning solutions, Bluetooth low energy (BLE) based positioning solutions, cellular network based positioning solutions and wireless local area network (WLAN) based positioning solutions.

A WLAN based positioning solution, for instance, may be divided in two stages, a training stage and a positioning stage.

In the training stage, learning data are collected. The data may be collected in the form of fingerprints that are based on measurements by mobile devices. A fingerprint may contain a location estimate and measurements taken from the radio interface. The location estimate may be for example GNSS based, sensor-based, or manually inputted. Measurements taken from the radio interface may comprise, by way of example, measured radio signal strengths and an identification of WLAN access points transmitting the radio signals. The training may be a continuous background process, in which mobile devices of a large number of consumers are continuously reporting measured data to a server. Consumers may consend to a participation in such a data collection, if their device is equipped with the needed functionality. This approach is also referred to as crowd-sourcing. Alternatively or in addition, mobile devices may be used for collecting fingerprints in a systematic manner Collected fingerprint data may be uploaded to a database in a server or in the cloud, where algorithms may be run to generate radio models of WLAN access points and/or radio maps for positioning purposes.

In the positioning stage, a mobile device may estimate its current location based on own measurements taken from the radio interface and on the data or a subset of data that is available from the training stage. Model data or radio map data that has been generated in the training stage may be transferred to mobile devices by a server via the Internet as assistance data for use in position determinations. Alternatively, model data and/or radio map data may be stored in a positioning server to which the mobile devices may connect to via the Internet for obtaining a position estimate.

A similar approach could be used for a positioning that is based on other types of terrestrial transmitters or on a combination of different types of terrestrial transmitters.

SUMMARY OF SOME EMBODIMENTS OF THE INVENTION

According to a first exemplary aspect of the invention, a method is disclosed, which comprises holding available, by a first apparatus, encrypted first positioning support data, wherein the encrypted first positioning support data are decryptable by a first decryption key, and wherein the encrypted first positioning support data are configured to enable one or more mobile devices receiving the encrypted first positioning support data and having access to the first decryption key to determine their position at least partially based on the first positioning support data; and automatically and repeatedly sending or triggering sending, by the first apparatus, the encrypted first positioning support data.

The method according to the first exemplary aspect of the invention may for example at least partially be performed by the first apparatus.

The method according to the first exemplary aspect of the invention may for example be a method for sending or triggering sending encrypted positioning support data (e.g. encrypted positioning support data of a positioning system).

According to the first exemplary aspect of the invention, furthermore a first apparatus is disclosed, which comprises means for at least partially realizing the method according to the first exemplary aspect of the invention. The means of the first apparatus may be implemented in hardware and/or software. They may comprise for instance at least one processor for executing computer program code for realizing the required functions, at least one memory storing the program code, or both.

Alternatively, they could comprise for instance circuitry that is designed to realize the required functions, for instance implemented in a chipset or a chip, like an integrated circuit. In general, the means may comprise for instance one or more processing means such as a processor and a memory. Optionally, the first apparatus may comprise various other components, like a radio interface, a data interface, a user interface etc.

For example, the first apparatus comprises at least one processor and at least one memory including computer program code, the at least one memory and the computer program code configured to, with the at least one processor, cause an apparatus at least to perform at least partially the method and/or the steps of the method according to the first exemplary aspect of the invention.

According to the first aspect of the invention, furthermore a system is disclosed, which comprises the first apparatus.

According to a second exemplary aspect of the invention, a method, performed by a mobile device, is disclosed, which comprises holding available, by the mobile device, at least a first decryption key; receiving, by the mobile device, encrypted first positioning support data, wherein the encrypted first positioning support data are decryptable by the first decryption key, and wherein the encrypted first positioning support data are configured to enable one or more mobile devices receiving the encrypted first positioning support data and having access to the first decryption key to determine their position at least partially based on the first positioning support data; decrypting the encrypted first positioning support data using the first decryption key; and determining a position of the mobile device at least partially based on the first positioning support data.

The method according to the second exemplary aspect of the invention may for example be a method for receiving encrypted positioning support data (e.g. encrypted positioning support data of a positioning system) to determine a position of a mobile device.

According to the second exemplary aspect of the invention, furthermore a mobile device is disclosed, which comprises means for at least partially realizing the method according to the second exemplary aspect of the invention. The means of the mobile device may be implemented in hardware and/or software. They may comprise for instance at least one processor for executing computer program code for realizing the required functions, at least one memory storing the program code, or both. Alternatively, they could comprise for instance circuitry that is designed to realize the required functions, for instance implemented in a chipset or a chip, like an integrated circuit. In general, the means may comprise for instance one or more processing means such as a processor and a memory.

Optionally, the mobile device may comprise various other components, like a radio interface, a data interface, a user interface etc.

For example, the mobile device comprises at least one processor and at least one memory including computer program code, the at least one memory and the computer program code configured to, with the at least one processor, cause an apparatus (e.g. the mobile device) at least to perform at least partially the method and/or the steps of the method according to the second exemplary aspect of the invention.

According to a third exemplary aspect of the invention, a method, performed by a server, is disclosed, which comprises holding available, by the server, a plurality of decryption keys; assigning at least a first decryption key of the plurality of decryption keys to a mobile device, wherein the first decryption key is useable to decrypt encrypted first positioning support data, and wherein the encrypted first positioning support data are configured to enable one or more mobile devices receiving the first positioning support data and having access to the first decryption key to determine their position at least partially based on the first positioning support data; and providing the first decryption key to the mobile device.

The method according to the third exemplary aspect of the invention may for example be a method for providing at least one decryption key of a plurality of decryptions keys to a mobile device to enable the mobile device to decrypt encrypted positioning support data of a positioning system.

According to the third exemplary aspect of the invention, furthermore a server is disclosed, which comprises means for at least partially realizing the method according to the third exemplary aspect of the invention. The means of the server may be implemented in hardware and/or software. They may comprise for instance at least one processor for executing computer program code for realizing the required functions, at least one memory storing the program code, or both. Alternatively, they could comprise for instance circuitry that is designed to realize the required functions, for instance implemented in a chipset or a chip, like an integrated circuit. In general, the means may comprise for instance one or more processing means such as a processor and a memory. Optionally, the server may comprise various other components, like a radio interface, a data interface, a user interface etc.

For example, the server comprises at least one processor and at least one memory including computer program code, the at least one memory and the computer program code configured to, with the at least one processor, cause an apparatus (e.g. the server) at least to perform at least partially the method and/or the steps of the method according to the third exemplary aspect of the invention.

According to a fourth exemplary aspect of the invention, a method, at least partially performed by a first apparatus and a mobile device, is disclosed, which comprises the steps of the method according to the first exemplary aspect of the invention and the steps of the method according to the second exemplary aspect of the invention. Optionally, the method according to the fourth exemplary aspect of the invention may additionally comprise the steps of the method according to the third exemplary aspect of the invention.

According to the fourth exemplary aspect of the invention, furthermore a system is disclosed, which comprises the first apparatus according to the first exemplary aspect of the invention and the mobile device according to the second exemplary aspect of the invention. Optionally, the system according to the fourth exemplary aspect of the invention may also comprise the server according to the third exemplary aspect of the invention.

In the following, the features of exemplary embodiments according to the first, second, third and fourth exemplary aspects of the invention are described by way of examples.

For example, the first positioning support data may be positioning support data of a positioning system (e.g. the system according to the fourth exemplary aspect of the invention). The first positioning support data are for example configured to enable one or more mobile devices receiving the first positioning support data to determine their position at least partially based on the first positioning support data. For example, the first positioning support data are configured to enable one or more mobile devices receiving the first positioning support data to determine their position at least partially based on the first positioning support data in combination with further data or information.

The encrypted first positioning support data may have been obtained by encrypting the first positioning support data using a first encryption key and a symmetric or asymmetric encryption algorithm. For a symmetric encryption algorithm, the first encryption key and the first decryption key are for example equal. For an asymmetric encryption algorithm, the first encryption key and the first decryption key are for example different. Examples of symmetric encryption algorithms include Advanced Encryption Standard (AES) encryption algorithm, Data Encryption Standard (DES) encryption algorithm, Triple DES encryption algorithm and International Data Encryption Algorithm (IDEA). Examples of asymmetric encryption algorithms include RSA encryption algorithm (Ron Rivest, Adi Shamir and Leonard Adleman), ElGamal encryption algorithm and elliptic curve cryptography (ECC) encryption algorithm.

The first apparatus may be a positioning support device, for instance a positioning support device of a positioning system (e.g. the system according to the fourth exemplary aspect of the invention). Alternatively or additionally, the first apparatus may be a stationary device. A stationary device is configured to be stationary when in operation and/or fixed to a particular location. A stationary device may be ground based and thus stationary with respect to Earth or only stationary within a particular environment, like a ship or a building. Of course, the first apparatus may equally be a module, like a chip or circuitry on a chip, for a stationary device.

Holding available the encrypted first positioning support data by the first apparatus may for example be understood to mean that the encrypted first positioning support data are stored in memory means of the first apparatus. Example of memory means include a volatile memory such as a Dynamic Random Access Memory (DRAM) and a non-volatile memory such as a Read Only Memory (ROM), a programmable ROM (PROM), an erasable-programmable ROM (EPROM), electrically erasable programmable ROM (EEPROM), a FLASH Memory, a Magnetoresistive Random Access Memory (MRAM), a Ferroelectric Random Access Memory (FeRAM) and a hard disc.

For example, the encrypted first positioning support data may be sent or triggered to be sent by the first apparatus in a signal or past part of a signal (e.g. a radio signal). The encrypted first positioning support data may for example be sent by transmitting the encrypted first positioning support data in such a signal or as part of such a signal by transmitting means of the first apparatus, for example a communication interface such as a radio interface (e.g. a transmitter and/or a transceiver). Optionally, such a signal may comprise further data in addition to the encrypted first positioning support data. Alternatively or additionally, the encrypted first positioning support data may for example be sent by transmitting means external to the first apparatus.

Repeatedly sending or triggering sending the encrypted first positioning support data by the first apparatus may for example be understood to mean that the encrypted first positioning support data may be sent or triggered to be sent irregularly or regularly, for example after predefined intervals or periods of time and/or after detection of a trigger event. Automatically sending or triggering sending the encrypted first positioning support data by the first apparatus may for example be understood to mean that the encrypted first positioning support data may be sent or triggered to be sent autonomously (e.g. without the necessity of any manual actions of a user). As an example, the encrypted first positioning support data may be sent or triggered to be sent after a period in the range of milliseconds, seconds, minutes, hours etc. An advantageous period for (triggering) sending the encrypted first positioning support data may be from 20 milliseconds to 10 seconds, for example. As an example, the intervals for (triggering) sending the encrypted first positioning support data may be set to a default value; alternatively or additionally, they may comprise a random component.

The mobile device may be a mobile user device such as a smartphone, a tablet computer, a notebook computer, a smart watch or a smart band, etc. For instance, the mobile device or the user of the mobile device is registered at a positioning system (e.g. the system according to the fourth exemplary aspect of the invention).

Holding available at least a first decryption key by the mobile device may for example be understood to mean that the first decryption key is stored in memory means of the mobile device. In this example, the first decryption key stored in memory means of the mobile device may be understood to be accessible by the mobile device. As disclosed above, example of memory means include a volatile memory and a non-volatile memory.

For example, the encrypted first positioning support data are received by the mobile device from the first apparatus. For example, the encrypted first positioning support data may be received by receiving means of the mobile device such as a radio interface (e.g. a receiver and/or a transceiver).

Receiving encrypted first positioning support data by the mobile device may be understood to mean that a signal (e.g. a radio signal) comprising the encrypted first positioning support data are received by the mobile device and that the encrypted first positioning support data are extracted from the received signal.

As a result of the decrypting the encrypted first positioning support data using the first decryption key the first positioning data may for example be obtained by the mobile device. Accordingly, the first decryption key may be useable to obtain the first positioning support data from the encrypted first positioning support data.

Determining a position of the mobile device at least partially based on the first positioning support data may for example be understood to mean that an estimate of a particular position of the mobile device (e.g. a current position or a former position of the mobile device) is determined at least partially based on the first positioning support data. A position of a mobile device may be understood to be either an absolute position of the mobile device or a relative position of the mobile device. An absolute position of the mobile device may for example describe a geographical position of the mobile device on Earth, for example by using a specific pairing of latitude and longitude in a Cartesian coordinate grid, a Spherical coordinate system or an ellipsoid-based system such as the World Geodetic System (WGS). Alternatively, a relative position of the mobile device may describe the position of the mobile device relative to a given location, for example a fixed geographical location on Earth or a fixed location in a particular environment, like a ship or a building. For example, the position of the mobile device may be determined at least partially based on the first positioning support data in combination with further information or data. The further information or data may for example be information or data obtained and/or observed by the mobile device, for example observation information as described in more detail below (e.g. one or more values representative of at least one measured characteristics of at least one radio signal at a particular position of the mobile device).

By automatically and repeatedly sending or triggering sending of the first positioning support data in encrypted form, the use of the first positioning support data for positioning determining may be restricted to one or more mobile devices having access to the first decryption key. Thus, the use of the first positioning support data for positioning determining by one or more mobile devices may be controlled by controlling the access of the mobile devices to the first decryption key. This may for example be advantageous to restrict use of the first positioning support data to mobile devices which or the users of which are registered at a positioning system. For example, the first positioning support data are positioning support data of the positioning system and the first apparatus is a positioning support device of the positioning system. For example, only mobile devices which or the users of which are registered at the positioning system may have access to the first decryption key and, thus, only these mobile devices can use the first positioning support data send or triggered to be sent in encrypted form by the first apparatus for determining their position at least partially based on the first positioning support data.

Furthermore, sending and receiving positioning support data in encrypted form may have the effect that security is added and intentional or accidental disturbances may be prevented. Instead of identifying positioning support data of a particular positioning system (e.g. only) by manufacturer specific data contained in the positioning support data, the mobile device may alternatively or additionally identify positioning support data of a particular positioning system by use of a decryption key according to the present invention. Only positioning support data received in encrypted form by the mobile device and decryptable by a decryption key of the particular positioning system accessible by the mobile device may for example be identified to be positioning support data of the particular positioning system. Filtering of positioning support data of different positioning system may thus at least partially be based on such a decryption key. Other positioning support data may for example be ignored by the mobile device such that conflicts between positioning support data of different positioning systems containing accidentally or intentionally the same manufacturer specific data may be prevented. An attack using positioning support data containing the same manufacturer specific data, but no encryption or encryption with the wrong encryption key may thus be not successful. Furthermore, the use of manufacturer specific data (and/or other data) to identify the positioning system to which the positioning support data belong may be omitted saving bandwidths and energy.

The server may be a positioning server, for example a positioning server of a positioning system (e.g. the system according to the fourth exemplary aspect of the invention). The server may be a local server, for example a local server located in the coverage area (e.g. the same building) of the first apparatus. Alternatively or additionally, the server may be a general service providing server such as an Internet server.

Holding available a plurality of decryption keys by the server may for example be understood to mean that the plurality of decryption keys is stored in memory means of the server. As disclosed above, example of memory means include a volatile memory and a non-volatile memory.

Assigning at least a first decryption key of the plurality of decryption keys to a mobile device may for example comprise verifying whether the mobile device or a user of the mobile device is allowed to have access to one or more decryption keys of the plurality of decryption keys and to only assign at least the first decryption key of the plurality of decryption keys to the mobile device, if the mobile device or a user of the mobile device is allowed to have access to the first decryption key. As an example, each of the decryption keys of the plurality of decryption keys is associated with another group of positioning support data; and a mobile device and/or a user of a mobile device is only allowed to have access to the first decryption key, if the mobile device and/or the user of the mobile device is allowed to use the positioning support data of the group of positioning support data associated with the first decryption key. For example, only mobile devices which or the users of which are registered at a positioning support service for use of the group of positioning support data associated with the first decryption key may have access to the first decryption key. For example, corresponding access information are stored in memory means of the server.

For example, verifying whether the mobile device or a user of the mobile device is allowed to have access to one or more decryption keys of the plurality of decryption keys is performed at least partially based on authentication information, for example received from the mobile device or the user of the mobile device. Examples of authentication information include a user name, a password, an identification number (e.g. a International Mobile Subscriber Identity, a personal identification number or a Medium Access Control (MAC) address), an authentication token, etc. The received authentication information may for example be compared with access information stored in memory means of the server to verify whether the mobile device or a user of the mobile device is allowed to have access to one or more decryption keys of the plurality of decryption keys.

For example, all decryption keys of the plurality of decryption keys which are assigned to the mobile device are provided to the mobile device.

Providing the first decryption key to the mobile device may for example be understood to mean that the first decryption key is sent or triggered to be sent to the mobile device. For example, the first decryption key is sent or triggered to be sent by the server in a signal or as part of a signal (e.g. a radio signal). The first decryption key may for example be sent by transmitting the first decryption key in such a signal or as part of such a signal by transmitting means of the server, for example a communication interface such as a radio interface (e.g. a transmitter and/or a transceiver). In certain exemplary embodiments of the third and fourth exemplary aspects of the invention, the signal may be a Bluetooth radio signal or a wireless local area network (WLAN) signal, as an example of signals of a non-cellular system. Alternatively or additionally, providing the first decryption key to the mobile device may for example be understood to mean that the first decryption key is made accessible to and/or retrievably by the mobile device, for example accessibly and/or retrievably by the mobile device stored in memory means of the server.

As described above, the present invention is inter-alia advantageous to control use of the first positioning support data. Optionally, the present invention is inter-alia advantageous to additionally control use of further positioning support data (e.g. the first and second positioning support data as described below). For example, a plurality of decryption keys may be used to control use of at least two groups of positioning support data (e.g. the first and second group of positioning support data as described above). For example, each group of positioning support data may be associated with another positioning support service restriction such as a service level (e.g. a maximum or minimum service level), an accuracy (e.g. a maximum or minimum accuracy), a service area (e.g. a maximum or minimum service area), a user group and/or mobile device group. Furthermore, the present invention may help to prevent disturbances and/or conflicts.

According to an exemplary embodiment of the first and fourth exemplary aspects of the invention, the respective methods further comprise holding available encrypted second positioning support data, wherein the encrypted second positioning support data are decryptable by a second decryption key, and wherein the encrypted second positioning support data are configured to enable one or more mobile devices receiving the encrypted second positioning support data and having access to the second decryption key to determine their position at least partially based on the second positioning support data; and automatically and repeatedly sending or triggering sending the encrypted second positioning support data.

According to a corresponding exemplary embodiment of the methods according to the second and fourth exemplary aspects of the invention, the respective methods further comprise holding available, by the mobile device, a second decryption key; receiving, by the mobile device, encrypted second positioning support data, wherein the encrypted second positioning support data are decryptable by the second decryption key, and wherein the encrypted second positioning support data are configured to enable one or more mobile devices receiving the encrypted second positioning support data and having access to the second decryption key to determine their position at least partially based on the second positioning support data; decrypting the encrypted second positioning support data using the second decryption key; and determining the position of the mobile device at least partially based on the second positioning support data. For example, the position of the mobile device may be at least partially based on a combination of the first positioning support data and the second positioning support data.

The steps relating to the (encrypted) second positioning support data and the second decryption key may be understood to basically corresponds to the above described steps relating to the (encrypted) first positioning support data and the first decryption key such that the above description may be understood to also for the steps relating to the (encrypted) second positioning support data and the second decryption key.

As an example, the steps of holding available encrypted second positioning support data and automatically and repeatedly sending or triggering sending the encrypted second positioning support data may be performed by the first apparatus. Alternatively, these steps may be performed by a second apparatus. Accordingly, the system according to the first exemplary embodiment and the system according to the fourth exemplary embodiment may comprise the second apparatus. The above description with respect to the first apparatus may be understood to also apply for the second apparatus.

The second positioning support data may be at least partially different from the first positioning support data and/or the second decryption key may be at least partially different from the first decryption key. In this example, only mobile devices having access to both the first and the second decryption key may be able to decrypt the encrypted first and second positioning support data. A mobile device having only access to one of the first and the second decryption key may be able to only decrypt the respective one of the encrypted first and second positioning support data. Sending and receiving encrypted first positioning support data decryptable by a first decryption key and encrypted second positioning support data decryptable by a second decryption key different from the first decryption key may thus have the effect that use of the first and second positioning support data can be controlled independently from each other.

According to an exemplary embodiment of the first, second, third and fourth exemplary aspects of the invention, the first decryption key is associated with a first group of positioning support data comprising the first positioning support data and, optionally, the second decryption key is associated with a second group of positioning support data comprising the second positioning support data.

For example, the first group of positioning support data may comprise in addition to the first positioning support data further positioning support data. Likewise, the second group of positioning support data may comprise in addition to the second positioning support data further positioning support data.

A particular group of positioning support data may be understood to comprise (e.g. to only comprise) positioning support data send or triggered to be sent in encrypted form by one or more apparatuses of a positioning system (e.g. the system according to the fourth exemplary aspect of the invention). Alternatively or additionally, one or more particular groups of positioning support data may be associated with one or more positioning support service restrictions such as a service level (e.g. a maximum or minimum service level), an accuracy (e.g. a maximum or minimum accuracy), a service area (e.g. a maximum or minimum service area), a restricted user group and/or restricted mobile device group. For example, one particular group of positioning support data may only comprise positioning support data which fulfil the positioning support service restrictions associated with the particular group of positioning support data. Thus, positioning support data of one particular group of positioning support data may enable position determining according to the positioning support service restrictions associated therewith.

A service area may be understood to be defined by a particular environment (e.g. a geographical area, a ship, a building, a floor of a building, a section of a building, etc.) inside which positions (e.g. absolute o relative positions) of one or mobile devices may be determined at least partially based on the positioning support data of the group of positioning support data associated with the service area. For example, the positioning support data of a particular group of positioning support data may only enable position determining in the service area associated with the particular group of positioning support data.

Likewise, an accuracy may be understood to define an accuracy with which positions (e.g. geographical positions) of one or mobile devices may be determined at least partially based on the positioning support data of the group of positioning support data associated with the accuracy. For example, the positioning support data of a particular group of positioning support data may only enable position determining with the accuracy associated with the particular group of positioning support data.

The first group of positioning support data may be associated with one or more first positioning support service restrictions such as a first service level, a first accuracy, a first service area, a first restricted user group and/or first restricted mobile device group. As an example, the second group of positioning support data may be different from the first group of positioning support data. In this example, the second group of positioning support data may for example be associated with one or more second positioning support service restrictions such as a second service level, a second accuracy, a second service area, a second restricted user group and/or second restricted mobile device group which are at least partially different from the positioning support service restrictions with which the first group of positioning support data are associated. Alternatively, the second group of positioning support data may be equal to the first group of positioning support data.

Alternatively or additionally, a particular combination of more than one group of positioning support data may be associated with positioning support service restrictions different to the positioning support service restrictions associated with the groups of positioning support data of the combination of more than one group of positioning support data alone. Thus, positioning support data of a particular combination of more than one group of positioning support data may enable position determining according to the positioning support service restrictions associated with the articular combination of more than one group of positioning support data. As exemplary described above, the first group of positioning support data may be associated with one or more first positioning support service restrictions and the second group of positioning support data may be associated with one or more second positioning support service restrictions. In this example, a combination of the first group of positioning support data and the second group of positioning support data may for example be associated with third positioning support service restrictions (e.g. a third service level, a third accuracy, a third service area, a third restricted user group and/or third restricted mobile device group) different from the first positioning support service restrictions and second positioning support service restrictions. For example, the third service area may be a combination of the first service area and the second service area. As a further example, the third accuracy may be higher than the first accuracy and the second accuracy.

For example, the positioning support data of the first group of positioning support data (e.g. the first positioning support data) may only be sent or triggered to be sent by one or more apparatuses such as the first apparatus (e.g. one or more apparatuses of a positioning system) in encrypted form decryptable by the first decryption key such that only mobile devices receiving the positioning support data of the first group of positioning support data (e.g. the first positioning support data) in encrypted form and having access to the first decryption key may use the positioning support data of the first group of positioning support data (e.g. the first positioning support data) to determine their position at least partially based thereon. Likewise, the positioning support data of the second group of positioning support data (e.g. the second positioning support data) may only be sent or triggered to be sent by one or more apparatuses such as the second apparatus (e.g. one or more apparatuses of a positioning system) in encrypted form decryptable by the second decryption key such that only mobile devices receiving the positioning support data of the second group of positioning support data (e.g. the second positioning support data) in encrypted form and having access to the second decryption key may use the positioning support data of the second group of positioning support data (e.g. the second positioning support data) to determine their position at least partially based thereon.

As discussed above, sending and receiving encrypted first positioning support data decryptable by a first decryption key and encrypted second positioning support data decryptable by a second decryption key different from the first decryption key may thus have the effect that use of the first and second positioning support data can be controlled independently from each other. Accordingly, use of different decryption keys for decrypting encrypted positioning support data of different groups of positioning support data associated with different positioning support service restrictions may thus allow to restrict use of the positioning support data of different groups of positioning support data to different users and/or mobile devices. For example, a user or a mobile device of the user may be only allowed to use positioning support data of a particular group of positioning support data enabling position determining in a particular building, whereas the user or the mobile device of the user may not be allowed to use positioning support data of another group of positioning support data enabling position determining in another building.

According to an exemplary embodiment of the first, second and fourth exemplary aspects of the invention, the encrypted first positioning support data are configured to enable one or more mobile devices receiving the encrypted first positioning support data and having access to the first decryption key to determine their position at least in a first service area and/or with a first accuracy and, optionally, the encrypted second positioning support data are configured to enable one or more mobile devices receiving the encrypted second positioning support data and having access to the second decryption key to determine their position at least in a second service area and/or with a second accuracy.

For example, the second service area may be at least partially different from the first service area. Alternatively, the second service area may be equal to the first service area As exemplary described above, the first service area may be defined by a first building or a first section of a building such that the first positioning support data may be used for position determining in the first building or the first section by a mobile device; and the second service area may be defined by another second building or another second section of the building such that the second positioning support data may be used for position determining in the second building or the second section by a mobile device.

Likewise, the second accuracy may be at least partially different from the first accuracy. Alternatively, the second accuracy may be equal to the first accuracy. As an example, the second accuracy may be higher than the first accuracy such that the second positioning support data may be used for precise positioning (e.g. with the second accuracy) by a mobile device, whereas the first positioning support data may be used for coarse positioning (e.g. with the first accuracy) by a mobile device.

Alternatively or additionally, the encrypted first positioning support data and the encrypted second positioning support data are configured to together enable one or more mobile devices receiving the encrypted first positioning support data and the encrypted second positioning support data and having access to the first decryption key and the second decryption key to determine their position at least with a third accuracy (e.g. higher than the first and/or second accuracy) or inside a third service area (e.g. a combination of the first and second service area). This may for example have the effect that a mobile device having access only to the first decryption key may only perform coarse positioning (e.g. position determining with the first accuracy) and/or positioning inside the first service area at least partially based on the first positioning support data, whereas a mobile device having access to the first decryption key and the second decryption key may perform precise positioning (e.g. position determining with the third accuracy) and/or positioning inside the third service area at least partially based on the first and second positioning support data.

According to an exemplary embodiment of the first, second, third and fourth exemplary aspects of the invention, the first decryption key is one decryption key of a plurality of decryption keys and, optionally, the second decryption key is one decryption key of the plurality of decryption keys. Therein, each of the decryption keys may for example be associated with another group of positioning support data (e.g. the first and a second group of positioning support data as described above).

According to an exemplary embodiment of the first, third and fourth exemplary aspects of the invention, the respective methods further comprise assigning a first encryption key to the first positioning support data and, optionally, a second encryption key to the second positioning support data. For example, the send or triggered to be sent encrypted first positioning support data may have been previously encrypted using the first encryption key assigned to the first positioning support data, and the send or triggered to be sent encrypted second positioning support data may have been previously encrypted using the second encryption key assigned to the second positioning support data. Alternatively or additionally, the first encryption key may be assigned to the first apparatus sending or triggering sending of the encrypted first positioning support data. Likewise the second encryption key may be assigned to the apparatus sending or triggering sending of the encrypted second positioning support data (i.e. the first apparatus or the second apparatus). For example, the step of assigning may be performed by the server according to the third aspect of the invention.

According to an exemplary embodiment of the first and fourth exemplary aspects of the invention, the respective methods further comprise obtaining the first encryption key by the first apparatus and, optionally, the second encryption key by the apparatus sending or triggering sending of the encrypted second positioning support data (i.e. the first apparatus or the second apparatus). For example, the first encryption key and/or the second encryption key are received by the first apparatus or second apparatus, respectively, from a server (e.g. the server according to the third aspect of the invention). Likewise, the methods according to the third and fourth exemplary aspects of the invention may further comprise holding available, by the server, a plurality of encryption keys which comprises the first encryption key and, optionally, the second encryption key and providing, by the server, the first encryption key to the first apparatus and, optionally, the second encryption key to the apparatus sending or triggering sending of the encrypted second positioning support data (i.e. the first apparatus or the second apparatus).

The plurality of encryption keys may for example be stored in memory means of the server. In certain exemplary embodiments of the invention the plurality of encryption keys may be received by the server from a backend server of a positioning system. The backend server may for example serve for key management in the entire positioning system. This may for example be advantageous, if the server according to the third exemplary aspect of the invention is a local server of the positioning system.

For example, the first encryption key and, optionally, the second encryption key are sent or triggered to be sent by the server in one or more signals or as part of one or more signals (e.g. a radio signal). The first encryption key and, optionally, the second encryption key data may for example be sent by transmitting the first encryption key and, optionally, the second encryption key in such one or more signals or as part of such one or more signals by transmitting means of the server, for example a communication interface such as a radio interface (e.g. a transmitter and/or a transceiver). In this example, the first encryption key may for example be obtained by the first apparatus by receiving the one or more signals comprising the first encryption key by the first apparatus (e.g. by receiving means of the first apparatus, e.g. a communication interface such as a radio interface) and extracting the first encryption key from the one or more received signals. Likewise, the second encryption key may be obtained by the apparatus sending or triggering sending of the encrypted second positioning support data (i.e. the first apparatus or the second apparatus). In certain exemplary embodiments of the third and fourth exemplary aspects of the invention, the one or more signals may be one or more Bluetooth radio signals and/or one or more wireless local area network (WLAN) signals.

This exemplary embodiment has the effect that the server may cause the first apparatus and/or the second apparatus to use the first encryption key and/or the second encryption key. This is for example advantageous to update the encryption keys used by the first apparatus and/or the second apparatus.

According to an exemplary embodiment of the first and fourth exemplary aspects of the invention, the respective methods further comprise obtaining the first positioning support data by the first apparatus, and encrypting the first positioning support data using a first encryption key. Optionally, the respective method may additionally comprise obtaining the second positioning support data by the first apparatus or the second apparatus, and encrypting the second positioning support data using the first encryption key.

For example, the first positioning support data may at least partially be obtained by measuring one or more characteristics of one or more radio signals observable by the location of the first apparatus. Likewise, the second positioning support data may at least partially be obtained by measuring one or more characteristics of one or more radio signals observable by the location of the apparatus sending or triggering sending of the encrypted second positioning support data (i.e. the first apparatus or the second apparatus). For example, the first apparatus and/or the second apparatus according to the first aspect of the invention may comprise means for measuring one or more characteristics of one or more radio signals observable by the location of the first apparatus and/or the second apparatus respectively. Such means for measuring may for example comprise or be part of at least one of a sensor, a radio interface such as a receiver (e.g. a Bluetooth receiver) and/or a transceiver (Bluetooth transceiver).

Alternatively or additionally, the first positioning support data may at least partially be obtained by receiving the first positioning support data by the first apparatus. Subsequently, the first positioning support data may be encrypted (e.g. using the first encryption key) such that the encrypted first positioning support data are decryptable by the first decryption key. Accordingly, the second positioning support data may at least partially be obtained by receiving the second positioning support data by the apparatus sending or triggering sending of the encrypted second positioning support data (i.e. the first apparatus or the second apparatus). Subsequently, the second positioning support data may be encrypted by this apparatus (e.g. using the first encryption key) such that the encrypted second positioning support data are decryptable by the second decryption key. For example, the first positioning support data and/or the second positioning support data are received by the first apparatus or second apparatus, respectively, from a server (e.g. the server according to the third aspect of the invention).

According to an exemplary embodiment of the first and fourth exemplary aspects of the invention, the respective methods further comprise obtaining the encrypted first positioning support data by the first apparatus and, optionally, the encrypted second positioning support data by the apparatus sending or triggering sending of the encrypted second positioning support data (i.e. the first apparatus or the second apparatus). For example, the encrypted first positioning support data and/or the encrypted second positioning support data are received by the first apparatus or second apparatus, respectively, from a server (e.g. the server according to the third aspect of the invention). Likewise, the methods according to the third and fourth exemplary aspects of the invention, may further comprise holding available, by the server, encrypted first positioning support data and, optionally, encrypted second positioning support data and providing, by the server, the encrypted first positioning support data to the first apparatus and, optionally, the encrypted second positioning support data to the apparatus sending or triggering sending of the encrypted second positioning support data (i.e. the first apparatus or the second apparatus).

The encrypted first positioning support data and, optionally, the encrypted second positioning support data may for example be stored in memory means of the server. In certain exemplary embodiments of the invention the encrypted first positioning support data and, optionally, the encrypted second positioning support data may be received by the server from a backend server of a positioning system. The backend server may for example serve for positioning support data management in the entire positioning system. This may for example be advantageous, if the server according to the third exemplary aspect of the invention is a local server of the positioning system. Alternatively or additionally, the server according to the third exemplary aspect of the invention may generate and encrypt the first positioning support data and, optionally, the second positioning support data.

For example, the encrypted first positioning support data and, optionally, the encrypted second positioning support data are sent or triggered to be sent by the server in one or more signals or as part of one or more signals (e.g. a radio signal). The encrypted first positioning support data and, optionally, the encrypted second positioning support data may for example be sent by transmitting the encrypted first positioning support data and, optionally, the encrypted second positioning support data in such one or more signals or as part of such one or more signals by transmitting means of the server, for example a communication interface such as a radio interface (e.g. a transmitter and/or a transceiver). In this example, the encrypted first positioning support data may for example be obtained by the first apparatus by receiving the one or more signals comprising the encrypted first positioning support data by the mobile device (e.g. by receiving means of the first apparatus, e.g. a communication interface such as a radio interface) and extracting the encrypted first positioning support data from the one or more received signals. Likewise, the encrypted second positioning support data may be obtained by the apparatus sending or triggering sending of the encrypted second positioning support data (i.e. the first apparatus or the second apparatus). In certain exemplary embodiments of the third and fourth exemplary aspects of the invention, the one or more signals may be one or more Bluetooth radio signals and/or one or more wireless local area network (WLAN) signals.

This exemplary embodiment has the effect that the first apparatus and/or the second apparatus do not need to have means (e.g. enough processing power) for encrypting the first positioning support data and/or the second positioning support. Furthermore, it has the effect that the server may cause the first apparatus and/or the second apparatus to use the encrypted first positioning support data and/or the encrypted second positioning support data. This is for example advantageous to update the encryption keys used by the first apparatus and/or the second apparatus.

According to an exemplary embodiment of the second, third and fourth exemplary aspects of the invention, the respective methods further comprise assigning the first decryption key and/or the second decryption key to the mobile device. As described above, assigning a first and/or second decryption key to the mobile device may for example comprise verifying whether the mobile device or a user of the mobile device is allowed to have access to the first and/or second decryption key and to only assign the first and/or second decryption key to the mobile device, if the mobile device or a user of the mobile device is allowed to have access to the first and/or second decryption key. For example, the step of assigning may be performed by the server according to the third aspect of the invention.

According to an exemplary embodiment of the second, third and fourth exemplary aspects of the invention, the respective methods further comprise obtaining the first decryption key and/or the second decryption key by the mobile device. For example, the first decryption key and/or the second decryption key may be obtained by the mobile device by receiving the first decryption key and/or the second decryption key by the mobile device. For example, the first decryption key and/or the second decryption key are received by the mobile device from a server (e.g. the server according to the third aspect of the invention). As described above, the first decryption key and, optionally, the second decryption key may be sent or triggered to be sent by the server in a signal or as part of a signal (e.g. a radio signal). Receiving the first decryption key and/or the second decryption key are received by the mobile device may accordingly be understood that a signal comprising the first decryption key and/or the second decryption key is received by the mobile device (e.g. by receiving means of the mobile device, e.g. a communication interface such as a radio interface) and the encrypted first positioning support data are extracted from the received signal.

Alternatively, the first decryption key and/or the second decryption key may be obtained by the mobile device by a user input on user interface means of the mobile device such as a keyboard and/or a touchscreen of the mobile device.

Alternatively or additionally, the first decryption key and/or the second decryption key or a representation thereof may be part of a computer program (e.g. the computer program according to the fifth exemplary aspect of the invention) stored in memory means of the mobile device. For example, the computer program may be a preinstalled computer program of the mobile device (e.g. a computer program preinstalled by the manufacturer of the mobile device).

According to an exemplary embodiment of the first, second, third and fourth exemplary aspects of the invention, the first apparatus and the second apparatus may be adjacent apparatuses of a plurality of apparatuses of a positioning system.

As an example, adjacent apparatuses of the plurality of apparatuses of the positioning system automatically and repeatedly send or trigger to send encrypted positioning support data of different groups of positioning support data and/or encrypted positioning support data decryptable by different decryption keys. Accordingly, the first apparatus may automatically and repeatedly send or trigger to send the encrypted first positioning support data decryptable by the first decryption key; and the second apparatus may automatically and repeatedly send or trigger to send the encrypted second positioning support data decryptable by the second decryption key different from the first decryption key. As described above, the first positioning support data may be positioning support data of a first group of positioning support data, and the second positioning support data may be positioning support data of a second group of positioning support data. This may for example have the effect that a mobile device having only access to (e.g. holding available) one of the first decryption key and the second decryption key may only use half of the positioning support data of the positioning system and, thus, may only perform coarse positioning (e.g. less precise than the mobile device having access to both of the first decryption key and the second decryption key). A mobile device having access to (e.g. holding available) both the first decryption key and the second decryption key may use all the positioning support data of the positioning system and, thus, may perform precise positioning (e.g. more precise than the mobile device having only access to one of the first decryption key and the second decryption key). In this example, the encryption keys may for example be utilized to control different level of positioning support services, like coarse and precise positioning.

According to an exemplary embodiment of the first and fourth exemplary aspects of the invention, the first apparatus is or is part of at least one of a Bluetooth beacon, a Bluetooth beacon enabling Bluetooth low energy (BLE) mode, and a Bluetooth low energy (BLE) beacon. According to a corresponding exemplary embodiment of the second and fourth exemplary aspects of the invention, the mobile device is or comprises one of a Bluetooth receiver, a Bluetooth receiver enabling Bluetooth low energy (BLE) mode, and a Bluetooth low energy (BLE) receiver.

Such beacons can be easily installed in various locations and require little to no maintenance. For example, a plurality of beacons may be easily distributed over a certain area and may cover a certain area with signals send by the beacons. However, Bluetooth beacons are often already installed in many buildings. Also, Bluetooth technologies are supported by many mobile user devices by default such as most smartphones, most tablet computers, most notebook computers, most smart watches and most smart bands, etc. Using Bluetooth beacons and/or BLE beacons as first apparatuses may thus have the effect that the method may be based on an existing infrastructure in buildings and/or on existing capabilities in many mobile devices without any adaptation of hardware. As a result, the approach may be globally scalable and have low maintenance and deployment costs. The deployment of new infrastructure, including for example beacons and tags, is possible but not necessary. In addition, regarding positioning utilizing received signal strength (RSS) the end-user experience may be acceptable with these technologies, since a horizontal positioning accuracy of 2-3 meters as well as a high reliability in floor detection may be achieved. The beacons may be stand-alone devices or be integrated into or attached to some other device. For instance, the first apparatus may be a Bluetooth tag or token or a part thereof comprising such a beacon. Bluetooth beacons, in particular in low energy mode, require comparably little energy and the use of Bluetooth low energy may enable a positioning with limited energy consumption at all involved devices.

A Bluetooth beacon that is employed for the invention may be any kind of Bluetooth beacon complying with any present or future standard. It is to be understood, however, that other types of first and second apparatuses than variations of Bluetooth beacons may be used as well, for instance tags or other devices that are configured to transmit ultra-wideband (UWB) signals or ultra-sound signals or any wireless signals that might emerge in the future.

As mentioned above, many mobile devices already comprise Bluetooth receivers and/or BLE receivers. Thus, each of the above embodiments may have the effect that embodiments of the method according to the first, second, third and fourth exemplary aspects of the invention can be employed without any further hardware updates on the mobile device side. In addition, such technologies for receiving the information representative of an ambient pressure by the mobile device allows for low power consumption on the mobile device side. As an example, the mobile device may comprise a Bluetooth and/or BLE component, which includes at least a Bluetooth and/or BLE receiver. The Bluetooth and/or BLE receiver may also be a part of a Bluetooth and/or BLE transceiver. The Bluetooth and/or BLE component may be configured to detect radio signals that are broadcast by Bluetooth and/or BLE beacons and to extract encrypted first positioning support data from detected Bluetooth (LE) signals.

According to an exemplary embodiment of the first and fourth exemplary aspects of the invention, the encrypted first positioning support data (and, optionally, the encrypted second positioning support data) are sent or triggered to be sent in a broadcast and/or as advertising data and/or as advertising data in at least one air interface packet and/or using at least one advertising channel and/or and using at least one advertising channel that is provided for broadcasts. According to a corresponding exemplary embodiment of the second and fourth exemplary aspects of the invention, the encrypted first positioning support data (and, optionally, the encrypted second positioning support data) are received in a broadcast and/or as advertising data and/or as advertising data in at least one air interface packet and/or using at least one advertising channel and/or and using at least one advertising channel that is provided for broadcasts.

As described above, the encrypted first positioning support data may be sent by transmitting the encrypted first positioning support data in a signal or as part of a signal (e.g. a radio signal); and the encrypted second positioning support data may be sent by transmitting the encrypted first positioning support data in the same or another signal or as part of the same or another signal (e.g. a radio signal). Accordingly, the broadcast may be a broadcast signal (e.g. a broadcast radio signal); and/or the advertising data may be advertising data in a signal (e.g. a radio signal such as a radio signal broadcast); and/or the advertising channel that is provided for broadcasts may be a advertising channel that is provided for broadcast signals (e.g. an advertising radio channel that is provided for broadcast radio signals).

Each of these embodiments may have the effect that a mobile device that is to receive the first or second positioning support data does not have to be enabled to open a communication channel and that the reception of respective data may thus be accelerated and facilitated. This may further have the effect that the data that are sent (e.g. transmitted) in a single broadcast (e.g. a broadcast signal such as a broadcast radio signal) may be used by many mobile devices. This may save bandwidth as well as energy by the first apparatus, the second apparatus and the mobile device. Advertising data are furthermore widely used for discovery of radio transmitters, which may enable a convenient adaptation of existing approaches for sending conventional advertising data for sending encrypted first positioning support data and, optionally, the encrypted second positioning support data according to exemplary embodiments of the invention.

According to an exemplary embodiment of the first, second and fourth exemplary aspects of the invention, the first positioning support data (and, optionally, the second positioning support data) comprise at least one of data which enable an identification of a transmitter of the encrypted first positioning support data and/or the encrypted second positioning support data; data which enable a determination of one or more characteristics of one or more radio signals; data of a radio model for one or more radio signals; data of a radio image for one or more radio signals. Therein, the one or more characteristics of one or more radio signals may be expected to be observable at different locations (e.g. geographical locations).

As an example, the first positioning support data relate to one or more characteristics of one or more radio signals send or triggered to be sent by the first apparatus. Accordingly, the first positioning support data may comprise at least one of data which enable a determination of one or more characteristics of one or more radio signals send (or triggered to be send) by the first apparatus; data of a radio model for one or more radio signals send (or triggered to be send) by the first apparatus; data of a radio image for one or more radio signals send (or triggered to be send) by the first apparatus.

If the encrypted second positioning support data are also send by the first apparatus, the second positioning support data may for example also relate to one or more characteristics of one or more radio signals send or triggered to be sent by the first apparatus. Otherwise, if the encrypted second positioning support data are sent by the second apparatus, the second positioning support data may for example relate to one or more characteristics of one or more radio signals send or triggered to be sent by the second apparatus. In this case, the second positioning support data may comprise at least one of data which enable a determination of one or more characteristics of one or more radio signals send (or triggered to be send) by the second apparatus; data of a radio model for radio signals send (or triggered to be send) by the second apparatus; data of a radio image for radio signals send (or triggered to be send) by the second apparatus.

Alternatively or additionally, the first positioning support data may comprise data which enable identification of the transmitter of the encrypted first positioning support data. As described above, the encrypted first positioning support may be transmitted by transmitting means of the first apparatus. In this case, the first positioning support data may comprise data which enable identification of the first apparatus. Likewise, the second positioning support data may comprise data which enable identification of the transmitter of the encrypted second positioning support data. The encrypted second positioning support data may be transmitted by transmitting means of the first apparatus or the second apparatus. Accordingly, the second positioning support data may for example comprise data which enable identification of the first apparatus or the second apparatus, respectively.

An example of data which enable an identification of a transmitter of encrypted positioning support data (e.g. the encrypted first positioning support data or the second positioning support data) may be understood to comprise an identification of the transmitter. Examples of such an identification include a serial number, a cellular cell identifiers (e.g. a Mobile Country Code (MCC), a Mobile Network Code (MNC), a Local Area Code (LAC), Cell Identity (CID), a UTRAN Cell ID (UC-ID), an LTE Cell Identity, a basic service set identification (BSSID), a medium access control (MAC) address and/or service set identifier (SSID).

An example of data which enable a determination of one or more characteristics of one or more radio signals may be understood to comprise one or more values representative of received signal strengths of one or more radio signals (e.g. radio signals send or triggered to be sent by the first or second apparatus). Using values representative of received signal strength as one or more characteristics of one or more radio signals may have the effect that such values may be determined for any kind of transmitter. It may further have the effect that they may be measured at a receiving end without establishing any connection with the transmitting end. A value representative of a received signal strength of a radio signal may be for example a received signal strength indication (RSSI) or a physical Rx level in dBm with a reference value of 1 mW, etc. Another kind of value representative of a received signal strength of a radio signal may be for example an indication of a path loss of a radio signal at a particular location. Other possible characteristics may comprise a timing advance (TA) value or a round-trip time value.

A radio model may for example be a parametric radio model. Data of such a parametric radio model may be considered to be data which enable determination of one or more characteristics of one or more radio signals that are expected to be observable at different locations as described above. For example, data of such a parametric radio model may comprise parameter values of the parametric radio model. Using parameter values of the parametric radio model may have the effect that the required amount of data for defining the one or more characteristics of one or more radio signals may be particularly small. An example of a parametric radio model is a path loss model for radio signals (e.g. for radio signals send or triggered to be sent by the first or second apparatus). In this case, the parameter values may comprise a location of the transmitter of the radio signals (e.g. a location of the first or second apparatus), a path loss exponent and an indication of a transmission power used by the transmitter.

Data of a radio image may for example be understood to define an association between one or more characteristics of one or more radio signals (e.g. radio signals send or triggered to be sent by the first or second apparatus) with different geographical locations. Such an association may be considered to be a radio image. Data of such a radio image may be considered to be data which enable determination of one or more characteristics of one or more radio signals that are expected to be observable at different locations as described above. A grid based radio image may be given for example by a set of one or more characteristics of one or more radio signals with each characteristic assigned to a respective grid point of a grid which is defined to correspond to a certain geographical area. Therein, each grid point of such a grid corresponds to a geographical location. A respective characteristic may be assigned to all or selected grid points of the grid. Using grid based radio image data may have the effect that the data may reflect details of the real radio environment particularly well.

According to an exemplary embodiment of the second and fourth exemplary aspects of the invention, the respective step of determining a position of the mobile device comprises obtaining, by the mobile device, observation information; and estimating a position of the mobile device at least partially based on the observation information and the first positioning support data. Alternatively or additionally, the position of the mobile device may be estimated at least partially based on the obtained observation information and the second positioning support data.

The observation information may for example be representative of at least one characteristic of at least one signal (e.g. a radio signal such as a Bluetooth signal) observable at a particular position of the mobile device (e.g. at a current or a former position of the mobile device). As an example, the at least one signal observable at the particular position of the mobile device may comprise the encrypted first positioning support data and/or the encrypted second positioning support data. For example, the observation information may comprise one or more measurement values representative of the at least one characteristic of the at least one radio signal observable at the particular position of the mobile device. In this case, the observation information may for example be obtained by the mobile device by measuring and/or extracting the at least one characteristic of the at least one radio signal observable at the particular position of the mobile device. For example, the mobile device according to the second exemplary aspect of the invention may comprise means for measuring and/or extracting the at least one characteristic of the at least one radio signal observable at the position of the mobile device. Such means for measuring and/or extracting may for example comprise or be at least one of a sensor, a communication interface such as a radio interface, for example a receiver (e.g. a Bluetooth receiver) and/or a transceiver (e.g. a Bluetooth transceiver). Alternatively or additionally, the observation information may be obtained by the mobile device by receiving the observation information by the mobile device (e.g. from a sensor, a communication interface, a radio interface such as receiver and/or a transceiver external to the mobile device).

In case the first positioning support data and/or the second positioning support data enable determination of one or more characteristics of one or more radio signals that are expected to be observable at different locations as described above, estimating a position of the mobile device may for instance comprise matching the observation information representative of at least one measured characteristic of the at least one radio signal with the first positioning support data and/or the second positioning support data.

For example, the position of the mobile device may be estimated for instance by determining an location which is represented by a respective grid point of a grid of a radio image of which data are contained in the first positioning support data and/or the second positioning support data. The location may for example be further selected such that it results in the minimum total difference (determined e.g. as the sum of absolute values or as Euclidian distance) between observation information representative of at least one measured characteristic of the at least one radio signal and the characteristic of the at least one radio signal expected at the grid point of the grid of the radio image.

If the first positioning support data and/or the second positioning support comprise data of a parametric radio model, the position may alternatively or additionally be estimated for instance by defining at least one circle around the location of the transmitter of the at least one radio signal defined by the parameter values, wherein the radius of each circle is computed at least partially based on the observation information representative of at least one measured characteristic of the at least one radio signal. These steps may for example be repeated for further observation information representative of at least one measured characteristic of at least one further radio signal to define one or more further circles. The position of the mobile device may then be estimated by determining the location(s) represented by the intersection(s) of the circles.

Alternatively or additionally, one or more sets of positioning support data such as data which enable determination of one or more characteristics of one or more radio signals that are expected to be observable at different locations and/or data of a radio model and/or a radio image may be stored in memory means of the mobile device, for example in form of a positioning support database. In this case, estimating a position of the mobile device may for instance comprise matching the observation information representative of at least one measured characteristic of the at least one radio signal with the positioning support data of the one or more sets of positioning support data stored in memory means of the mobile device.

For example, the obtained observation information at least is based on or comprises at least one of a value representative of a received signal strength; a timing measurement; an angle of arrival; a magnetic field strength and/or direction; and an identification of a transmitter.

For example, in the case of measurements on cellular radio signals, the observation information may contain one or more values representative of their (emitted/received) signal strengths and/or path losses and/or timing measurements like propagation delay, timing advance (TA) or round-trip time (RTT). Further, the observation information may alternatively or additionally contain one or more values representative of an angle of arrival of the signal and/or a magnetic field strength and/or a magnetic field direction of the signal. Alternatively or additionally, the observation information may contain one or more values representative of a global and/or local identification of the cellular transmitters or cells observed. Non-limiting examples of an identification are cellular cell identifiers (e.g. a Mobile Country Code (MCC), a Mobile Network Code (MNC), a Local Area Code (LAC) and/or a Cell Identity (CID) in case of coverage areas of a 2G mobile communications system, a UTRAN Cell ID (UC-ID) in case of a 3G mobile communications system, or an LTE Cell Identity in case of a 4G communications system).

For measurements on Bluetooth radio signals or wireless local area network (WLAN) signals, as an example of signals of a non-cellular system, the observation information may contain one or more values representative of the signal strength of received signals (received signal strength indication RSSI or physical Rx level in dBm with a reference value of 1 mW, for example). The measurements may alternatively or additionally contain one or more values representative of a identification of a transmitter of the observed transmitters, for example a basic service set identification (BSSID) like the medium access control (MAC) address of observed access points (APs), the service set identifier (SSID) of the access points.

Alternatively or additionally, the obtained observation information may be derived from at least one of a Global Navigation Satellite System (GNSS); a Wireless Local Area Network (WLAN) system; a Bluetooth (BT) system; a Radio Frequency Identification (RFID) system; a cellular network system; one or more sensors; and a manual input. For example, the first apparatus and, optionally, the second apparatus may be part of the system (e.g. a positioning system and/or the system according to the fourth aspect of the invention) from which the position information is derived. As an example, the first apparatus may be a Bluetooth beacon and the position information may be derived from this Bluetooth system, e.g. the received signal strength (RSS) of the Bluetooth radio signal. The sensor may for instance be an accelerometer, a gyroscope, a magnetometer, a barometer or any other sensor suitable for deriving position information. A manual input may be performed by the user (e.g. of the mobile device).

According to an exemplary embodiment of the first, second and fourth exemplary aspects of the invention, the first positioning support data (and, optionally, the second positioning support data) are compressed data or non-compressed data. If the data are compressed, an exemplary embodiment of the methods according to the second and fourth aspects of the invention may further comprise decompressing the first positioning support data (and, optionally, the second positioning support data).

According to an exemplary embodiment of the fourth exemplary aspect of the invention, the system is a positioning system, preferably a self-contained positioning system. Accordingly, the first and second apparatus according to the first exemplary aspect of the invention may be or may be part of a positioning support device of a positioning system, preferably a self-contained positioning system. Likewise, the mobile device according to the second exemplary aspect of the invention and/or the server according to the third exemplary aspect of the invention may be part of a positioning system, preferably a self-contained positioning system.

According to a fifth exemplary aspect of the invention a computer program code is disclosed, the computer program code when executed by a processor causing an apparatus to perform the actions of the method of any one of the methods of the first, second, third and fourth exemplary aspects of the invention.

According to an exemplary embodiment of the fifth exemplary aspect of the invention, furthermore a computer readable storage medium is disclosed, in which computer program code according to the fifth exemplary aspect of the invention is stored.

The features and example embodiments of the invention described above may equally pertain to the different aspects according to the present invention.

It is to be understood that the presentation of embodiments of the invention in this section is merely exemplary and non-limiting.

Other features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims. It should be further understood that the drawings are not drawn to scale and that they are merely intended to conceptually illustrate the structures and procedures described herein.

BRIEF DESCRIPTION OF THE FIGURES

FIGS. 6a to 6c are flow charts illustrating exemplary embodiments methods according to the second exemplary aspect of the invention;

FIG. 1 is a block diagram of an exemplary embodiment of a first apparatus 1 according to the first and fourth exemplary aspects of the invention. In the following, it is assumed that the first apparatus 1 is a beacon 1.

Figure 1:
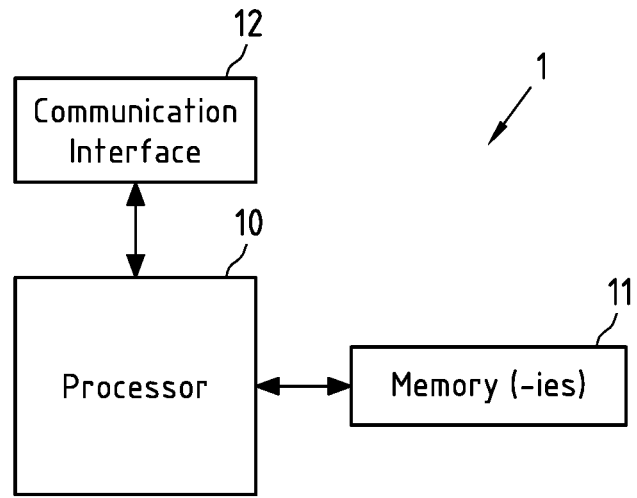
FIG. 1 is a block diagram of an exemplary embodiment of a first apparatus according to the first and fourth exemplary aspects of the invention.

Beacon 1 comprises a processor 10. Processor 10 may represent a single processor or two or more processors, which are for instance at least partially coupled, for instance via a bus. Processor 10 executes a program code stored in memory 11 (e.g. program code causing beacon 1 to perform one or more of the embodiments of a method according to the first aspect of the invention (as for example further described below with reference to FIG. 5), when executed on processor 10). Some or all of memory 11 may also be included into processor 10. Furthermore, in memory 11 encrypted first positioning support data and/or encrypted second positioning support data may for example be stored. For instance, one of or all of memory 11 may be fixedly connected to processor 10 or at least partially removable from processor 10, for instance in the form of a memory card or stick. Memory 11 may for instance be a volatile or non-volatile memory. It may for instance be a RAM or DRAM memory. It may for instance be a FLASH memory (or a part thereof), any of a ROM, PROM, EPROM, EEPROM, MRAM or a FeRAM (or a part thereof) and/or a hard disc (or a part thereof), to name but a few examples. It may for instance be used as a working memory for processor 20 when executing an operating system and/or programs. Memory 11 may also comprise an operating system for processor 10. Memory 11 may for instance comprise a first memory portion that is fixedly installed in beacon 1, and a second memory portion that is removable from beacon 1, for instance in the form of a removable SD memory card.

Processor 10 further controls a communication interface 12 configured to receive and/or output data and/or information. For instance, communication interface 12 may at least comprise a BLE component including a BLE transmitter (TX). The communication interface 12 may additionally comprise a BLE receiver (RX). The transmitter and receiver may also be part of a BLE transceiver (TRX). The BLE transmitter enables beacon 1 to send radio signals in line with any current or future version of the Bluetooth standard supporting a low energy mode. Likewise, the BLE receiver enables beacon 1 to receive radio signals in line with any current or future version of the Bluetooth standard supporting a low energy mode.

Accordingly, beacon 1 may be a Bluetooth beacon, a Bluetooth beacon enabling Bluetooth low energy mode, and a Bluetooth low energy beacon.

It is to be understood that beacon 1 may comprise various other components.

Figure 2:
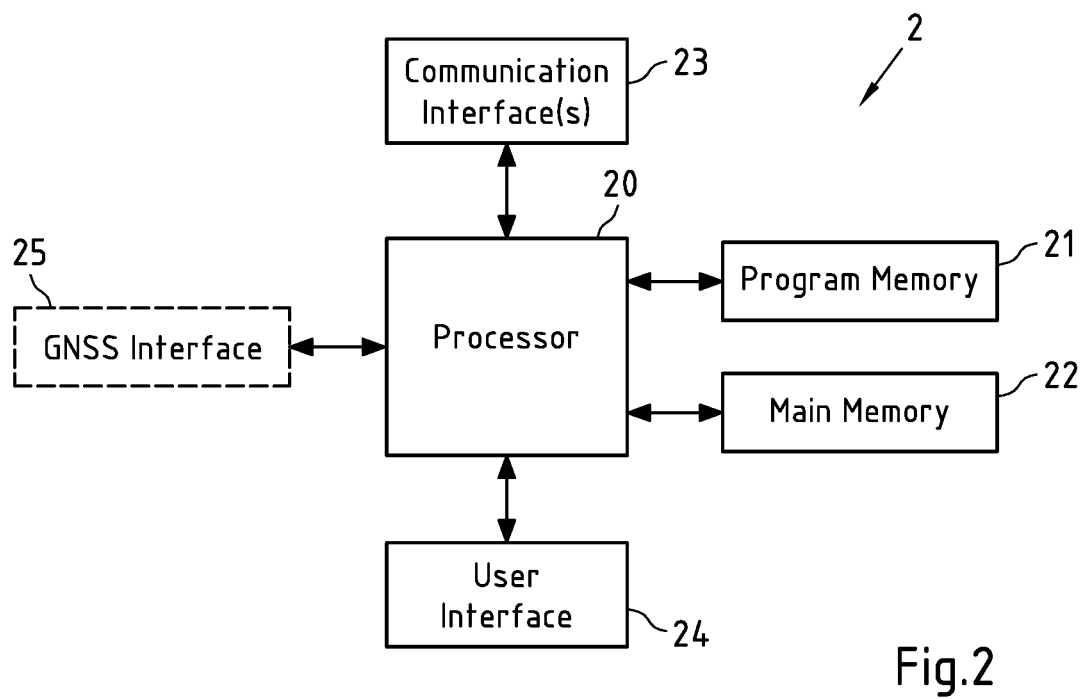
FIG. 2 is a block diagram of an exemplary embodiment of a mobile device according to the second and fourth exemplary aspects of the invention.

FIG. 2 is a block diagram of an exemplary embodiment of a mobile device 2 according to the second and fourth exemplary aspects of the invention. For instance, the mobile device 2 is or forms a part (e.g. as a module) of a mobile user device such as a smartphone, a tablet computer, a notebook computer, a smart watch or a smart band, etc.

Mobile device 2 comprises a processor 20. Processor 20 may represent a single processor or two or more processors, which are for instance at least partially coupled, for instance via a bus. Processor 20 executes a program code stored in program memory 21 (for instance program code causing mobile device 2 to perform one or more of the embodiments of a method (or parts thereof) according to the second aspect of the invention (as for instance further described below with reference to FIG. 6), when executed on processor 20), and interfaces with a main memory 22. Some or all of memories 21 and 22 may also be included into processor 20. One of or both of memories 21 and 22 may be fixedly connected to processor 20 or at least partially removable from processor 20, for instance in the form of a memory card or stick. Program memory 21 may for instance be a non-volatile memory. It may for instance be a FLASH memory (or a part thereof), any of a ROM, PROM, EPROM, MRAM or a FeRAM (or a part thereof) or a hard disc (or a part thereof), to name but a few examples. Program memory 21 may also comprise an operating system for processor 20. Program memory 21 may for instance comprise a first memory portion that is fixedly installed in mobile device 2, and a second memory portion that is removable from apparatus 2, for instance in the form of a removable SD memory card. One or more sets of position support data (e.g.

first positioning support data and/or second positioning support data), for instance in a database, that are useable by mobile device 2 to determine its position may for example be stored in program memory 21. Furthermore, in memory 21 a first decryption key and/or a second decryption key may for example be stored that are useable by mobile device 2 to decrypt encrypted first positioning support data and/or encrypted second positioning support data, respectively.

Main memory 22 may for instance be a volatile memory. It may for instance be a DRAM memory, to give non-limiting example. It may for instance be used as a working memory for processor 20 when executing an operating system and/or programs.

Processor 20 further controls a communication interface 23 configured to receive and/or output data and/or information. For instance, communication interface 23 may be configured to receive radio signals from beacon 1. For this, the communication interface 23 may at least comprise a BLE component including at least a BLE receiver (RX). It is to be understood that the BLE receiver may also be a part of a BLE transceiver. The BLE component is configured to scan for radio signals that are broadcast by BLE beacons such as beacon 1, to extract advertising data contained in detected BLE signals. It is to be understood that any computer program code based processing required for receiving and evaluating BLE signals may be stored in an own memory of the BLE component and executed by an own processor of the BLE component, or it may be stored for example in memory 22 and executed for example by processor 20.

Figure 3:
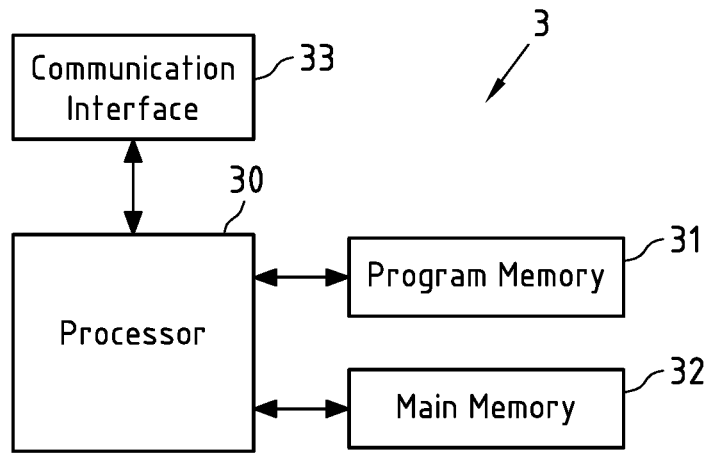
FIG. 3 is a block diagram of an exemplary embodiment of a server according to the third and fourth exemplary aspects of the invention.
Figure 4:
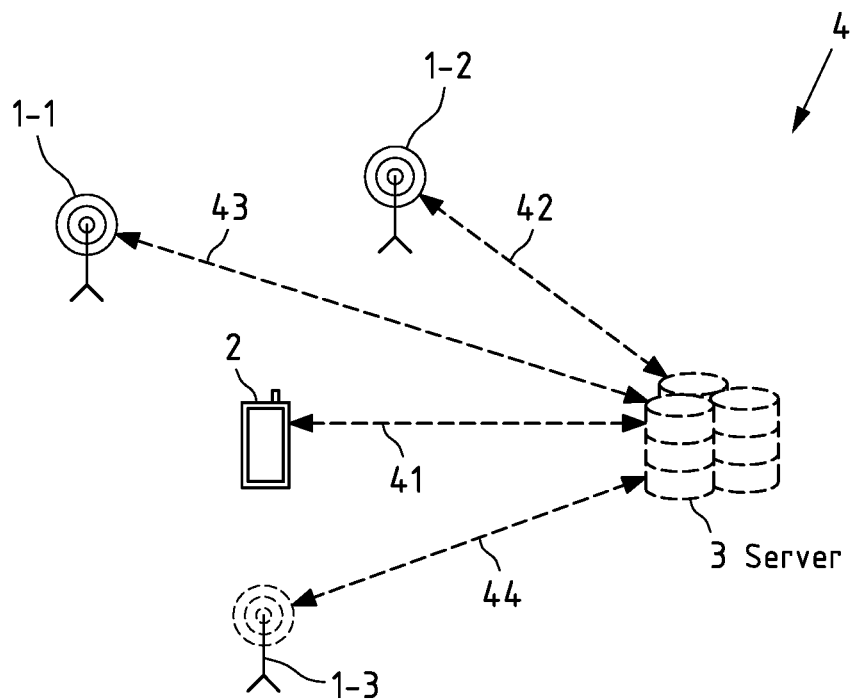
FIG. 4 is a schematic illustration of an exemplary embodiment of a system according to the fourth exemplary aspect of the invention.

Communication interface 23 may further be configured to communicate with a server 3 (see FIGS. 3 and 4). This may for instance comprise receiving the first decryption key and/or the second decryption key from server 3. The communication may for instance be based on a wireless connection. In addition to the BLE component above, the communication interface 23 may thus comprise further circuitry such as modulators, filters, mixers, switches and/or one or more antennas to allow transmission and/or reception of signals, e.g. for the communication with server 3. In embodiments of the invention, communication interface 23 is inter alia configured to allow communication according to a 2G/3G/4G/5G cellular communication system and/or a non-cellular communication system, such as for instance a WLAN network. Nevertheless, the communication route between mobile device 2 and server 3 may equally well at least partially comprise wire-bound portions. For instance, server 3 may be connected to a back-bone of a wireless communication system (associated with mobile device 2) via a wire-bound system such as for instance the Internet.

Processor 20 further controls a user interface 24 configured to present information to a user of mobile device 20 and/or to receive information from such a user. User interface 24 may for instance be the standard user interface via which a user of mobile device 2 controls other functionality thereof, such as making phone calls, browsing the Internet, etc.

Processor 20 may further control an optional GNSS interface 25 configured to receive positioning information of an GNSS such as Global Positioning System (GPS), Galileo, Global Navigation Satellite System (i.e. "Globalnaja Nawigazionnaja Sputnikowaja Sistema", GLONASS) and Quasi-Zenith Satellite System (QZSS). It should be noted that, even in case mobile device 2 has a GNSS interface 25, the user of mobile device 2 can still benefit from using positioning technologies based on other sources, such as transmitters of communication systems (such as beacons such as beacon 1), since these technologies may reduce time-to-first-fix and/or lower power consumption as compared to GNSS-based positioning. Also, and perhaps even more important, positioning technologies based on signals from transmitters of communication systems work indoors, which is generally a challenging environment for GNSS-based technologies.

The components 21-25 of apparatus 2 may for instance be connected with processor 20 by means of one or more serial and/or parallel busses.

FIG. 3 is a block diagram of an exemplary embodiment of a server 3 according to the third and fourth exemplary aspects of the invention. Server 3 comprises a processor 30. Processor 30 may represent a single processor or two or more processors, which are for instance at least partially coupled, for instance via a bus. Processor 30 executes a program code stored in program memory 31 (for instance program code causing server 3 to perform one or more of the embodiments of a method (or parts thereof) according to the second aspect of the invention (as for instance further described below with reference to FIG. 7), when executed on processor 30). Program memory 31 may for example store a plurality of decryption keys. Processor 30 further interfaces with a main memory 32 (for instance acting as a working memory).

Processor 30 further controls a communication interface 33 configured to receive and/or sent data and/or information. For instance, communication interface 33 may be configured to communicate with mobile device 2 (as described above). The communication may for instance be based on a wireless connection. The communication interface 33 may thus comprise circuitry such as modulators, filters, mixers, switches and/or one or more antennas to allow transmission and/or reception of signals (e.g. radio signals), for example for the communication with mobile device 2. In embodiments of the invention, communication interface 33 is inter alia configured to allow communication according to a 2G/3G/4G/5G cellular communication system and/or a non-cellular communication system, such as for instance a WLAN network. Nevertheless, the communication route between mobile device 2 and server 3 may equally well at least partially comprise wire-bound portions. For instance, server 3 may be connected to a back-bone of a wireless communication system (associated with mobile device 2) via a wire-bound system such as for instance the Internet.

In case, server 3 is located onsite, that is in particular in the coverage areas of the beacon 1-1, 1-2, 1-3 of system 4 (as described below), the communication interface 33 may also be configured to communicate with beacons 1-1, 1-2, 1-3. For this, the communication interface 33 may additionally comprise a BLE component including at least a BLE receiver, a BLE transmitter and/or a BLE transceiver (as explained in more detail above with respect to communication interface 23 of mobile device 2).

FIG. 4 is a schematic illustration of an exemplary embodiment of a system 4 according to the fourth exemplary aspect of the invention.

System 4 may be a self-contained positioning system comprising beacons 1-1 and 1-2. Beacons 1-1 and 1-2 may correspond to beacon 1 as described above with respect to FIG. 1. Optionally, system 4 may comprise further beacons as indicated by optional beacon 1-3 illustrated in FIG. 4. In the following, reference is made only to beacons 1-1 and 1-2 without limiting the scope of the invention. Furthermore, system 4 comprises mobile device 2 as described above with respect to FIG. 2.

Beacons 1-1 and 1-2 automatically and repeatedly send encrypted positioning support data. Mobile device 2 may receive the encrypted positioning support data sent by beacons 1-1 and 1-2. For example, beacon 1-1 send encrypted first positioning support data decryptable by a first decryption key and beacon 1-2 send encrypted second positioning support data decryptable by a second decryption key different from the first decryption key. The encrypted first positioning support data are configured to enable one or more mobile devices such as mobile device 2 receiving the encrypted first positioning support data and having access to the first decryption key to determine their position at least partially based on the first positioning support data. Likewise, the encrypted second positioning support data are configured to enable one or more mobile devices such as mobile device 2 receiving the encrypted second positioning support data and having access to the second decryption key to determine their position at least partially based on the second positioning support data. Accordingly, mobile device 2 may only use the first and second positioning support data send in encrypted form by beacons 1-1 and 1-2, respectively, if it has access to both the first and the second decryption key. For example, the encrypted first positioning support data may belong to a first group of encrypted positioning support data only comprising encrypted positioning support data decryptable with the first decryption key, and the encrypted second positioning support data may belong to a second group of encrypted positioning support only comprising encrypted positioning support data decryptable with the second decryption key.

The use of different decryption keys may for example allow to control different level of positioning support services such as coarse positioning and precise positioning. For example, beacons 1-1 and 1-2 may be beacons of a plurality of beacons evenly distributed at a certain site such as a building. Adjacent beacons of this plurality of beacons may automatically and repeatedly send positioning support data in encrypted form decryptable with different decryption keys of the first decryption key and the second decryption key. Accordingly, beacons 1-1 and 1-2 may for example be adjacent beacons of such a plurality of beacons. A mobile device of a user of a coarse positioning service may for example have only access to either the first or the second decryption key and thus may only be able to decrypt half of the encrypted positioning support data. This may have the effect that positioning is not be as accurate as if the mobile device has access to both the first decryption key and the second decryption key.

Alternatively or additionally, the use of different decryption keys may for example allow to provide different services to different users and/or mobile devices. For example, positioning support data relating to different sections may be sent in encrypted form decryptable with different decryption keys of the first decryption key and the second decryption key. Accordingly, beacons 1-1 and 1-2 may for example be installed at different sections of the certain site such as different floors of the building. For example beacon 1-1 may be installed in a visitor area of the certain site, whereas beacon 1-2 may be installed in a restricted area of the certain cite.

In system 4, mobile device 2 is configured to receive signals from beacons 1-1 and 1-2, as the beacons 1-1 and 1-2 provide radio coverage in the area of the mobile device 2. However, at different positions within the coverage area of the respective beacon 1-1 and 1-2, the mobile device 2 may for example observe and/or measure different received signal strengths (RSS). This may allow mobile device 2 to obtain observation information representative of at least one characteristic of at least one signal (e.g. the signal from beacon 1-1 or 1-2) at a particular position of the mobile device. As already described, non-limiting examples of a beacon such as beacons 1-1 and 1-2 may be a Bluetooth beacon, a Bluetooth beacon enabling Bluetooth low energy mode, and a Bluetooth low energy beacon. Of course, the mobile device may also receive signals of further transmitter such as cells, nodes or base stations (or sectors thereof) of a cellular communication system, such as for instance a 2G, 3G, 4G or 5G communication system, or a node (e.g. an access point AP or base station BS) of a non-cellular communication system, such as for instance a WLAN network.

Mobile device 2 may also be configured to determine position information based on a Global Navigation Satellite System (GNSS), for example (not shown). However, in particular for indoor situations, there may be no reception of GNSS signals or the GNSS signals may be too weak in order to get reliable location information.

Optionally, system 4 may comprise server 3 as described above with respect to FIG. 3. Server 3 may for example be a local server located onsite (i.e. on the site covered by system 4). As illustrated in FIG. 4, server 3 may communicate via connection 41 with mobile device 2. Connection 41 may be an uni-directional or a bi-directional connection. Alternatively or additionally, server 3 may communicate via connection 42, 43 and 44 with beacons 1-1, 1-2 and 1-3. Each of connections 42, 43 and 44 may be an uni-directional or a bi-directional connection. If server 3 is a local server, connections 41, 42, 43 and 44 may be local wireless connections such as Bluetooth connections (e.g. BLE connections) and/or WLAN connections. Nevertheless, these connections may equally well at least partially comprise wire-bound portions. For example, server 3 may be connected to a back-bone of a wireless communication system (associated with mobile device 2 and/or beacons 1-1, 1-2 and 1-3) via a wire-bound system such as for instance the internet or a local area network (LAN, e.g. a ethernet).

Server 3 may for example be enabled to provide one or more encryption keys to mobile device 2 via connection 41. Moreover, server 3 may for example be enabled to modify and/or update the configuration of beacons 1-1, 1-2 and 1-3 via connections 42, 43 and 44, respectively. For example, server 3 may transmit (e.g. new and/or updated) configuration information such as encryption keys, positioning support data and/or encrypted positioning support data to beacons 1-1, 1-2 and 1-3 via connections 42, 43 and 44.

Figure 5A:
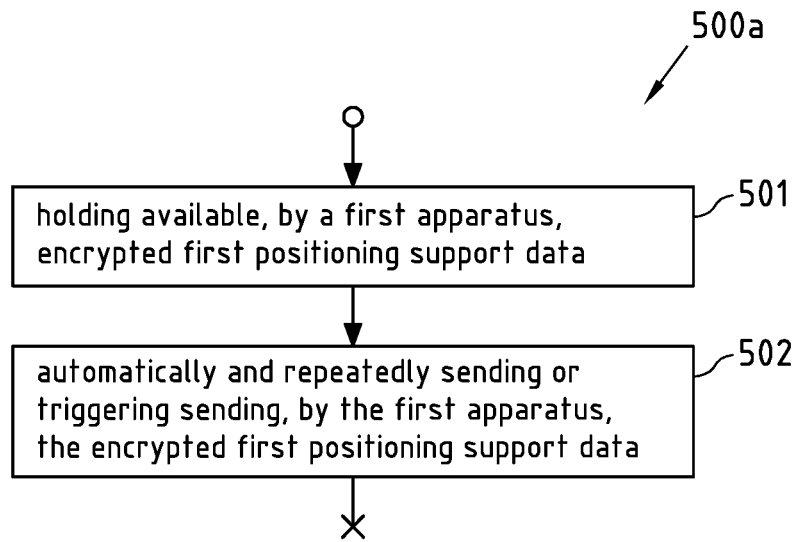
FIGS. 5a to 5b are flow charts illustrating exemplary embodiments methods according to the first exemplary aspect of the invention.

FIG. 5a is a flow chart 500a illustrating an exemplary embodiment of a method according to the first exemplary aspect of the invention. The actions of flow chart 500a may be performed by beacon 1, for example. In the following, it is assumed that the first apparatus of flow chart 500a is represented by beacon 1 by way of example. Processor 10 and the program code stored in memory 11 of beacon 1-1 may cause the beacon 1-1 to perform some or all of the actions 501 and 502 when program code is retrieved from memory 11 and executed by processor 10.

Beacon 1 holds available stored encrypted first positioning support data, wherein the encrypted first positioning support data are decryptable by a first decryption key, and wherein the encrypted first positioning support data are configured to enable one or more mobile devices receiving the encrypted first positioning support data and having access to the first decryption key to determine their position at least partially based on the first positioning support data.

(action 501) The encrypted first positioning support data may be stored in memory 11 of beacon 1.

Beacon 1 furthermore automatically and repeatedly send or trigger to send the encrypted first positioning support data to enable mobile devices receiving the data to determine their position at least partially based on the data. (action 502)

The encrypted first positioning support data may be sent by transmitting the encrypted first positioning support data in a signal via communication interface 12. The signal may comprise further encrypted and/or un-encrypted data.

As described above, communication interface 12 may for example comprise or be a BLE transmitter and/or a BLE transceiver. Accordingly, beacon 1 may be a BLE beacon. In this example, the encrypted first positioning support data may be transmitted in a Bluetooth signal in line with any current or future version of the Bluetooth standard supporting a low energy mode. The following example details are based on the Specification of the Bluetooth® System Version 4.2 of Dec. 2, 2014 by the Bluetooth SIG. For further details, reference is made to this specification.

The BLE advertising broadcast channel is provided to set up connections between two devices or to communicate broadcast information between unconnected devices. The BLE advertising broadcast channel is a set of three fixed physical channels.

Each BLE packet that is transmitted over the air interface has a defined packet format that is used on a link layer for both advertising channel packets and data channel packets. The packet comprises a preamble of 1 octet, an access address of 4 octets, a packet data unit (PDU) of 2 to 257 octets, and a cyclic redundancy check value (CRC) of 3 octets. Advertising channel packets use a fixed value for the preamble and for the access address of the BLE packet. When a BLE packet is transmitted in an advertising physical channel, the PDU is a specifically defined advertising channel PDU. The CRC is calculated over the PDU.

The specifically defined advertising channel PDU comprises a header of 16 bits and a payload. The header comprises, among other fields, a field for indicating a PDU type, a TxAdd field and a length field for indicating the payload length in octets. The possible range of the payload length is 6 to 37 octets.

The payload comprises an AdvA field of 6 octets for indicating a beacon's public or random device address, as indicated by the one bit TxAdd field in the header. In the present case, the beacon's public device address in the form of a 6 octet MAC address may be used, and the bit of the TxAdd field may be set to "0". The 6 octet MAC address functions as BLE beacon ID. The payload further comprises an AdvData field of 0 to 31 octets. The AdvData field may receive advertising data of any type that is stored in the advertising data section of memory 11 of beacon 1. Optionally, the payload may comprise a manufacturer specific data field that is used for manufacturer specific data and may for example be used to identify the manufacturer of beacon and/or the system which comprises beacon 1 and to which the first positioning support data belong.

The transmission intervals for the broadcast of advertising packets may be set to a default value. It may also comprise a random component in order to enable mobile devices to detect signals from all BLE beacons (such as beacons 1-1, 1-2 and 1-3) in the neighborhood.

By way of example, the encrypted first position support data may be stored in the advertising data section of memory 11 of beacon 1. (e.g. this action may correspond to action 501) The content of the data stored in the advertising data section of memory 11 may then be distributed to the Adv- Data fields of the payload of the advertising PDUs of the required number of subsequent advertising packets that are broadcast by beacon 1 with the set frequency. (e.g. this action may correspond to action 502) The broadcasted advertising packets may comprise further encrypted and/or un-encrypted data. In certain embodiments of the invention, the manufacturer specific data field may be omitted from the advertising PDUs, since the decryption key may allow an identification of the manufacturer of beacon 1 and/or of the system which comprises beacon land to which the first positioning support data belong.

It is to be understood that alternatively or additionally any other packet format could be used just the same, for example though not exclusively a packet structure providing for an advertising data field of up to 255 octets in line with future Bluetooth specifications, etc.

Figure 5B:
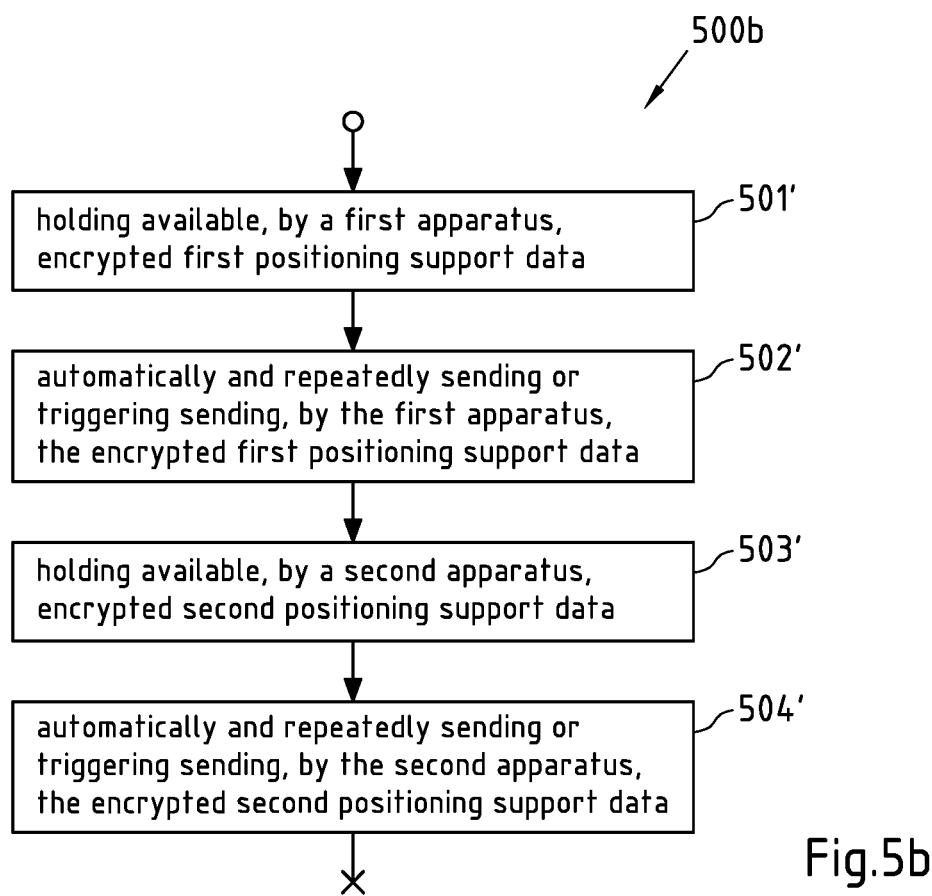

FIG. 5b is a flow chart 500b illustrating an exemplary embodiment of a method according to the first exemplary aspect of the invention. The actions of flow chart 500b may be performed by beacon 1-1 and beacon 1-2, for example. In the following, it is assumed that the first apparatus of flow chart 500b is represented by beacon 1-1 and the second apparatus is represented by beacon 1-2 by way of example. Processor 10 and the program code stored in memory 11 of beacon 1-1 may cause the beacon 1-1 to perform some or all of the actions 501 and 502 when program code is retrieved from memory 11 and executed by processor 10. Likewise, Processor 10 and the program code stored in memory 11 of beacon 1-2 may cause the beacon 1-2 to perform some or all of the actions 503 and 504 when program code is retrieved from memory 11 and executed by processor 10.

Beacon 1-1 holds available stored encrypted first positioning support data, wherein the encrypted first positioning support data are decryptable by a first decryption key, and wherein the encrypted first positioning support data are configured to enable one or more mobile devices receiving the encrypted first positioning support data and having access to the first decryption key to determine their position at least partially based on the first positioning support data. (action 501') The encrypted first positioning support data may be stored in memory 11 of beacon 1-1.

Beacon 1-1 furthermore automatically and repeatedly send or trigger to send the encrypted first positioning support data to enable mobile devices receiving the data to determine their position at least partially based on the data. (action 502')

The encrypted first positioning support data may be sent by transmitting the encrypted first positioning support data in a signal via communication interface 12 of beacon 1-1. For example, the encrypted first positioning support data may be sent in one or more advertising packets of a BLE advertising broadcast channel as described above.

Beacon 1-2 holds available stored encrypted second positioning support data, wherein the encrypted second positioning support data are decryptable by a second decryption key, and wherein the encrypted second positioning support data are configured to enable one or more mobile devices receiving the encrypted second positioning support data and having access to the second decryption key to determine their position at least partially based on the second positioning support data. (action 503') The encrypted second positioning support data may be stored in memory 11 of beacon 1.

Beacon 1-2 furthermore automatically and repeatedly send or trigger to send the encrypted second positioning support data to enable mobile devices receiving the data to determine their position at least partially based on the data.

(action 504') The encrypted second positioning support data may be sent by transmitting the encrypted second positioning support data in a signal via communication interface 12.

The encrypted second positioning support data may be sent by transmitting the encrypted second positioning support data in a signal via communication interface 12 of beacon 1-2. For example, the encrypted second positioning support data may be sent in one or more advertising packets of a BLE advertising broadcast channel as described above.

FIG. 6a is a flow chart 600a illustrating an exemplary embodiment of a method according to the second exemplary aspect of the invention. The actions of flow chart 600a may be performed by mobile device 2, for example. In the following, it is assumed that the mobile device of flow chart 600a is represented by mobile device 2 by way of example. Processor 20 and some of the program code stored in memory 21 of the mobile device 2 may cause mobile device 2 to perform some or all of the presented actions when the program code is retrieved from memory 21 and executed by processor 20.

Mobile device 2 holds available at least a first decryption key stored in program memory 21 of mobile device 2. (action 601)

As an example, the first decryption key may be part of a preinstalled computer program of mobile device 2. Alternatively, the first decryption key may for example be received by the mobile device 2 from server 3 of system 4 as illustrated in FIG. 4 and, subsequently, be stored in memory 21 of mobile device 2.

Encrypted first positioning support data are received by the mobile device 2, wherein the encrypted first positioning support data are decryptable by the first decryption key, and wherein the encrypted first positioning support data are configured to enable one or more mobile devices receiving the encrypted first positioning support data and having access to the first decryption key to determine their position at least partially based on the first positioning support data. (action 602).

The encrypted first positioning support data may be received by the mobile device 2 via communication interface 23 of the mobile device 2. For example, a signal comprising the encrypted first positioning support data may be received by the mobile device 2 via the communication interface 23. Subsequently, the encrypted first positioning support data may be extracted from the received signal.

In the exemplary embodiment of system 4, mobile device 2 may for example receive the encrypted first positioning support data in a signal send from beacon 1-1. As described above, the encrypted first positioning support data may be sent by beacon 1-1 by transmitting the encrypted first positioning support data in one or more advertising packets of a BLE advertising broadcast channel. In this case, the communication interface 23 of the mobile device 2 may be a BLE receiver or a BLE transceiver scanning the environment for radio signals on any BLE advertising channel and receiving BLE advertising packets that are broadcast by BLE such as beacon 1-1 over any of the BLE advertising channels. From the received BLE advertising packets, mobile device 2 may then extract the encrypted first positioning support data. The complete encrypted first positioning support data may be distributed to two or more advertising packets broadcast by the beacon 1-1. Mobile device 320 may therefore combine for beacon 1-1 the data from several packets to obtain the complete encrypted first positioning support data. In case a received advertising packet contains other data than encrypted first positioning support data, the packet may be discarded or used for other purposes.

Mobile device 2 decrypts the encrypted first positioning support data using the first decryption key. (action 603) As a result of this action, the first positioning support data may be obtained by mobile device 2.

Mobile device 2 then determines a particular position of mobile device 2 at least partially based on the first positioning support data. (action 604)

FIG. 6b is a flow chart 600b illustrating an exemplary embodiment of a method according to the second exemplary aspect of the invention. The actions of flow chart 600b may be performed by mobile device 2, for example. In the following, it is assumed that the mobile device of flow chart 600b is represented by mobile device 2 by way of example. Processor 20 and some of the program code stored in memory 21 of the mobile device 2 may cause mobile device 2 to perform some or all of the presented actions when the program code is retrieved from memory 21 and executed by processor 20.

The purpose of flow chart 600b is to illustrate that the actions of flow chart 600a of FIG. 6a may be performed for further decryption keys (e.g. a second decryption key), further encrypted positioning support data (e.g. encrypted second positioning support data) and further positioning support data (e.g. second positioning support data).

Flow chart 600b thus differs from flowchart 600a inter-alia in that mobile device 2 holds available in addition to the first decryption key at least a second decryption key stored in program memory 21 of mobile device 2. (action 601'). Optionally, mobile device 2 may hold available further decryption keys stored in in program memory 21 of mobile device 2.

As described above, the decryption keys hold available by mobile device 2 may be part of a preinstalled computer program of mobile device 2. Alternatively, the decryption keys may for example be received by the mobile device 2 from server 3 of system 4 as illustrated in FIG. 4 and, subsequently, be stored in memory 21 of mobile device 2.

Encrypted first positioning support data and encrypted second positioning support data are received by mobile device 2. (action 602') Optionally, further encrypted first positioning support data are received by mobile device 2.

As described above with respect to the encrypted first positioning support data, also the encrypted second (and optionally further) positioning support data may be received by the mobile device 2 via communication interface 23 of the mobile device 2. For example, a signal comprising the respective encrypted positioning support data may be received by the mobile device 2 via the communication interface 23. Subsequently, the respective encrypted positioning support data may be extracted from the received signal.

In the exemplary embodiment of system 4, mobile device 2 may for example receive the encrypted first positioning support data in a signal send from beacon 1-1 and the encrypted second positioning support data in a signal send from beacon 1-2. Beacons 1-1 and 1-2 may be beacons of a plurality of beacons and, thus, further encrypted positioning support data may for example be received from further beacons of the plurality of beacons such as beacon 1-3. As described above, each of the encrypted positioning support data may be sent by one of the beacons of the plurality of beacons such as beacons 1-1 and 1-2 (2 (and, optionally, further beacons of the plurality of beacons such as beacon 1-3) by transmitting the encrypted positioning support data in one or more advertising packets of a BLE advertising broadcast channel. For example, the encrypted first positioning support data may be sent by beacon 1-1 by transmitting the encrypted first positioning support data in one or more advertising packets of a BLE advertising broadcast channel. Likewise, the encrypted second positioning support data may be sent by beacon 1-2 by transmitting the encrypted second positioning support data in one or more advertising packets of a BLE advertising broadcast channel. In this case, the communication interface 23 of the mobile device 2 may be a BLE receiver or a BLE transceiver scanning the environment for radio signals on any BLE advertising channel and receiving BLE advertising packets that are broadcast by BLE such as beacons 1-1 and 1-2 (and, optionally, further beacons of the plurality of beacons such as beacon 1-3) over any of the BLE advertising channels. From the received BLE advertising packets, mobile device 2 may then extract the encrypted first positioning support data and the encrypted second positioning support data (and optionally further encrypted positioning support data). The complete encrypted first positioning support data may be distributed to two or more advertising packets broadcast by the beacon 1-1. Mobile device 2 may therefore combine for beacon 1-1 the data from several packets to obtain the complete encrypted first positioning support data. Likewise, mobile device 2 may combine for beacon 1-2 the data from several packets to obtain the complete encrypted second positioning support data. In case a received advertising packet contains other data than encrypted first positioning support data and the encrypted second positioning support data, the packet may be discarded or used for other purposes.

Mobile device 2 then decrypts the encrypted first positioning support data using the first decryption key and the encrypted second positioning support data using the second decryption key. (action 603') Optionally, further encrypted positioning support data that have been received by mobile device 2 and the decryption keys useable to decrypt the further encrypted positioning support data are stored in memory 21 of mobile device may be decrypted. As a result of this action, the first positioning support data and the second positioning support data (and, optionally, the further positioning support data) may be obtained by mobile device 2.

Mobile device 2 then determines a particular position of mobile device 2 at least partially based on the first positioning support data and the second positioning support data (and, optionally, the further positioning support data). (action 604')

Figure 6C:
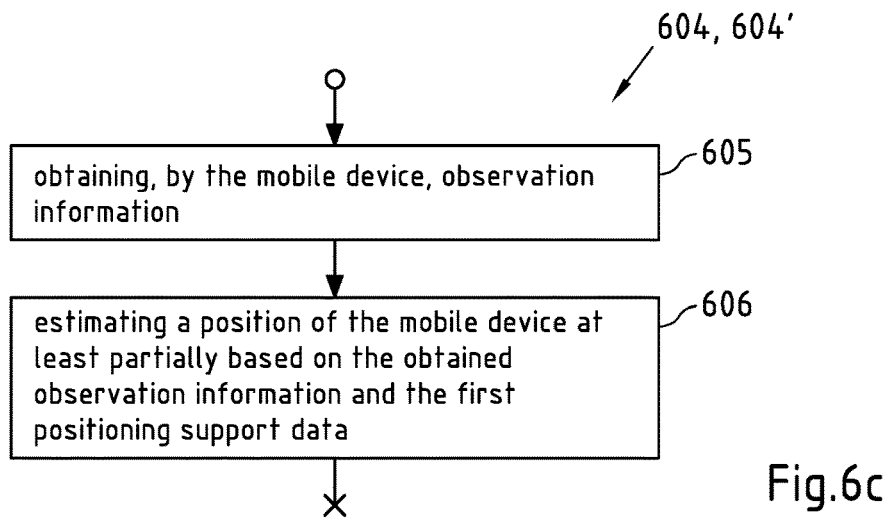

FIG. 6c is a flow chart illustrating an exemplary embodiment of action 604 of flowchart 600a or action 604' of flowchart 600b. Processor 20 and some of the program code stored in memory 21 of the mobile device 2 may cause mobile device 2 to perform some or all of the presented actions when the program code is retrieved from memory 21 and executed by processor 20.

Firstly, observation information is obtained by the mobile device 2. (action 605)

As described above, the observation information may for example be representative of at least one characteristic of at least one signal (e.g. a radio signal such as a Bluetooth signal) observable at a particular position of the mobile device (e.g. at a current or a former position of the mobile device). As an example, the at least one signal observable at the particular position of the mobile device may comprise the encrypted first positioning support data and/or the encrypted second positioning support data. For example, the observation information may comprise one or more measurement values representative of the at least one characteristic of the at least one radio signal observable at the particular position of the mobile device. Examples of the at least one characteristic of the at least one radio signal include a received signal strength (RSS); a timing measurement; an angle of arrival (AoA); a magnetic field strength and/or direction; and an identification of a transmitter.

In case, the communication interface 23 of the mobile device 2 may be a BLE receiver or a BLE transceiver scanning the environment for radio signals on any BLE advertising channel and receiving BLE advertising. Mobile device 2 may obtains RSS values for each detected BLE beacon signal. For example, communication interface 23 measures the received signal strength (RSS) of each radio signal and extracts a medium access control (MAC) address of the transmitting BLE beacon (e.g. beacon 1-1, 1-2 or 1-3) from the radio signal. The measured radio signal strength values may then be considered to be representative of characteristics of the observed radio signals and the MAC addresses may be considered to be identifications of the BLE beacons (e.g. beacons 1-1, 1-2 or 1-3) transmitting the radio signals.

Mobile device 2 then estimates a position of the mobile device 2 at least partially based on the obtained observation information and the first positioning support data. In the case of action 604' of flow chart 600b mobile device may estimate a position of the mobile device 2 at least partially based on the obtained observation information and the first positioning support data and the second positioning support data (and, optionally, the further positioning support data). (action 606).

For example, the first positioning support data may comprise at least one of data which enable an identification of beacon 1-1; data which enable a determination of one or more characteristics of one or more radio signals send (or triggered to be send) by beacon 1-1, wherein the one or more characteristics of one or more radio signals may be expected to be observable at different locations; data of a radio model for one or more radio signals send (or triggered to be send) by beacon 1-1; data of a radio image for one or more radio signals send (or triggered to be send) by beacon 1-1. Likewise, the second positioning support data may comprise at least one of data which enable an identification of beacon 1-2; data which enable a determination of one or more characteristics of one or more radio signals send (or triggered to be send) by beacon 1-2, wherein the one or more characteristics of one or more radio signals may be expected to be observable at different locations; data of a radio model for one or more radio signals send (or triggered to be send) by beacon 1-2; data of a radio image for one or more radio signals send (or triggered to be send) by beacon 1-2.

In case the first positioning support data and/or the second positioning support data enable determination of one or more characteristics of one or more radio signals that are expected to be observable at different locations, estimating a position of the mobile device 2 may for instance comprise matching the observation information representative of at least one measured characteristic of the at least one radio signal with the first positioning support data and/or the second positioning support data.

In the following it is assumed by way of example that the first positioning support data comprise data of a radio image for one or more radio signals send by beacon 1-1 and the second positioning support data comprise data of a radio image for one or more radio signals send by beacon 1-2. A radio image defines an association of observable characteristics of radio signals of a particularly positioning support device with different locations. As described above, mobile device 2 may obtain RSS values for each detected BLE beacon signal. Accordingly, mobile device 2 may for example estimate its position by matching the RSS values obtained in action 605 with the radio image data of all BLE beacons 300 for which positioning support data (e.g. radio image data) could be extracted from received advertising packets.

The position may be estimated for instance by determining a geographical location which is represented by a respective grid point of the grid of a radio image of all BLE beacons (e.g. beacons 1-1, 1-2 and 1-3) for which radio image data are available. The geographical location is further selected such that it results in the minimum total difference (determined e.g. as the sum of absolute values or as Euclidian distance) between the respective received signal strength value measured for the BLE beacons and the respective received signal strength value for these BLE beacons expected at the grid point of the grid of the radio image of the respective BLE beacon.

The position may also be estimated by calculating likelihood values by matching the received signal strength values of at least one BLE beacon with the radio image data of at least one BLE beacon for which radio image data has been obtained. The position of mobile device 2 may then be estimated, for example, as the location for which the likelihood that mobile device 2 is located at this location achieves the maximum value.

Figure 7A:
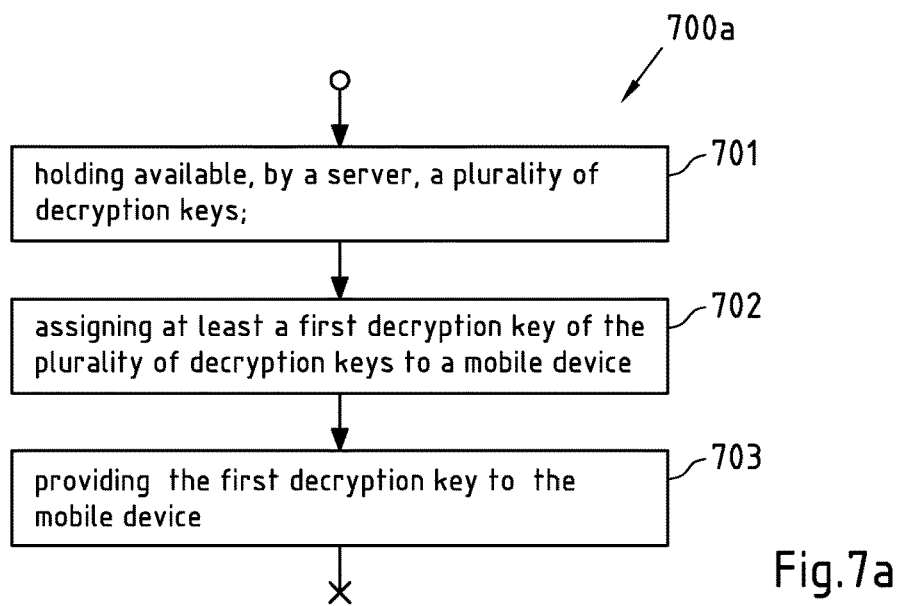
FIGS. 7a to 7b is a flow chart illustrating an exemplary embodiment of a method according to the third exemplary aspect of the invention.

FIG. 7*a* is a flow chart 700*a* illustrating an exemplary embodiment of a method according to the third exemplary aspect of the invention. The actions of flow chart 700*a* may be performed by server 3, for example. In the following, it is assumed that the server of flow chart 700*a* is represented by server 3, and the mobile device is represented by mobile device 2 by way of example. Processor 30 and some of the program code stored in memory 31 of server 3 may cause server 3 to perform some or all of the presented actions when the program code is retrieved from memory 31 and executed by processor 30.

Server 3 holds available a plurality of decryption keys stored in memory 31 of server 3. (action 701) For example, the plurality of decryption keys are stored in a database.

Server 3 assigns at least a first decryption key of the plurality of decryption keys to mobile device 2. (action 702) As described in more detail above, assigning at least a first decryption key of the plurality of decryption keys to mobile device 2 may for example comprise verifying whether the mobile device 2 or a user of the mobile device 2 is allowed to have access to one or more decryption keys of the plurality of decryption keys and to only assign at least the first decryption key of the plurality of decryption keys to the mobile device, if the mobile device or a user of the mobile device is allowed to have access to the first decryption key. For example, corresponding access information are stored in memory 31 of server 3.

For example, verifying whether the mobile device or a user of the mobile device 2 is allowed to have access to one or more decryption keys of the plurality of decryption keys is performed at least partially based on authentication information, for example received from the mobile device 2 (e.g. via connection 41 of system 4 as described above) and/or the user of the mobile device 2. The received authentication information may then for example be compared by server 3 with access information stored in memory 31 of the server 3 to verify whether the mobile device 2 and/or a user of the mobile device 2 is allowed to have access to one or more decryption keys of the plurality of decryption keys.

Server 3 provides the first decryption key to mobile device 2. (action 703) Providing the first decryption key to the mobile device may for example be understood to mean that the first decryption key is made accessible to the mobile device 2. For example, all decryption keys of the plurality of decryption keys which are assigned to the mobile device 2 are provided to the mobile device 2. Providing the first decryption key to the mobile device 2 may for example be understood to mean that the first decryption key is sent or triggered to be sent to the mobile device 2 (e.g. via connection 41 of system 4 as described above).

As discussed above, using an encryption for positioning support data may serve for adding security to the system, since it may prevent others from disturbing the positioning system intentionally or by accident. Additionally, using an encryption may allow to identify that the positioning support data relate to a certain positioning system or company such that system, company or manufacturer specific data may be omitted. Using an encryption may also serve for limiting use of the system, for example to a certain group of users. Furthermore, decryption keys can be used to create service restriction to a company, a service area, a service level and/or a group of users. For example, using different decryption keys may be used to provide different positioning support services and/or different levels of positioning support services and to control access thereto. For example, a decryption key may be shared to enable positioning of specific building with a user. A user can be given a key which will enable him to use self-contained positioning system in a building where beacons send positioning support data in encrypted form decryptable using the same decryption key.

Figure 7B:
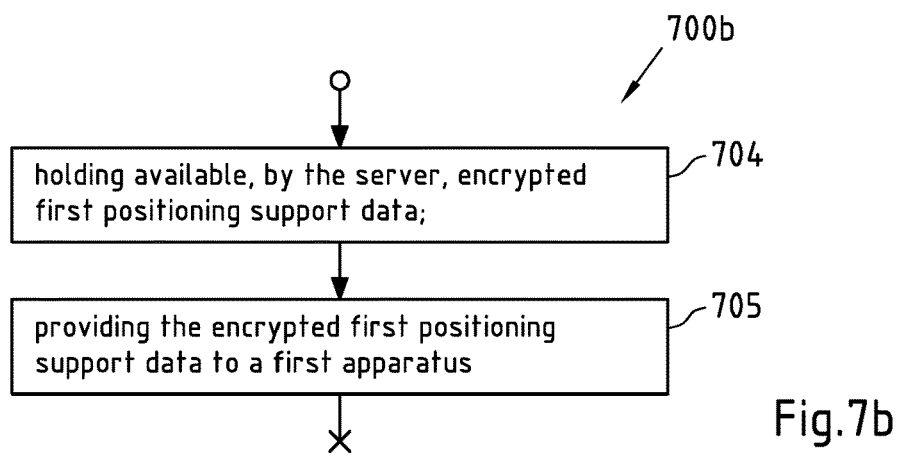

FIG. 7*b* is a flow chart 700*b* illustrating optional additional step of the exemplary embodiment of the method according to the third exemplary aspect of the invention as illustrated in flow chart 700*a* of FIG. 7*a*. The actions of flow chart 700*b* may be performed by server 3, for example. In the following, it is assumed that the server of flow chart 700*b* is represented by server 3, and the first apparatus is represented by beacon 1-1 by way of example. Processor 30 and some of the program code stored in memory 31 of server 3 may cause server 3 to perform some or all of the presented actions when the program code is retrieved from memory 31 and executed by processor 30.

Server 3 holds available encrypted first positioning support data and, optionally, encrypted second positioning support data stored in memory 31 of server 3. (action 704)

For example, the encrypted first positioning support data and, optionally, the encrypted second positioning support data have been received by server 3 from a backend server of system 4 (not shown in FIG. 4). For example, server 3 and such a backend server are connected via the Internet. Alternatively or additionally, server 3 may have generated and encrypted the first positioning support data and, optionally, the second positioning support data.

Server 3 provides the encrypted first positioning support data to beacon 1-1. (action 705) Providing the encrypted first positioning support data to beacon 1-1 may for example be understood to mean that the encrypted first positioning support data are sent or triggered to be sent to beacon 1-1 (e.g. via connection 43 of system 4 as described above). Likewise, server 3 may provide the encrypted second positioning support data to beacon 1-2.

Figure 8:
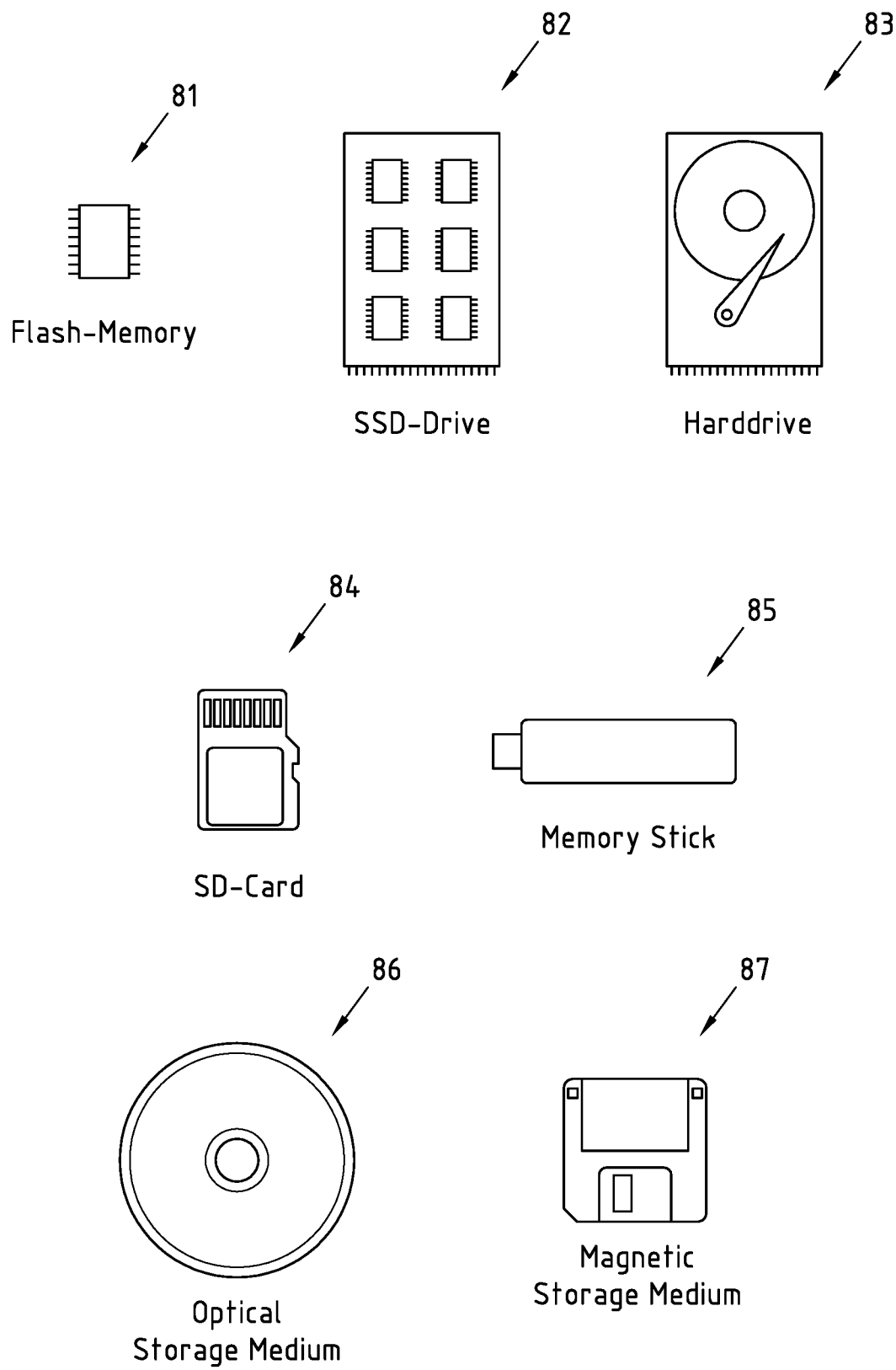
FIG. 8 is a schematic illustration of examples of tangible storage media according to the present invention.

FIG. 8 is a schematic illustration of examples of tangible storage media according to the present invention, that may for instance be used to implement memory 11 of FIG. 1, program memory 21 of FIG. 2 and/or program memory 31 of FIG. 3. To this end, FIG. 8 displays a flash memory 80, which may for instance be soldered or bonded to a printed circuit board, a solid-state drive 81 comprising a plurality of memory chips (e.g. Flash memory chips), a magnetic hard drive 82, a Secure Digital (SD) card 83, a Universal Serial Bus (USB) memory stick 84, an optical storage medium 85 (such as for instance a CD-ROM or DVD) and a magnetic storage medium 86.

Any presented connection in the described embodiments is to be understood in a way that the involved components are operationally coupled. Thus, the connections can be direct or indirect with any number or combination of intervening elements, and there may be merely a functional relationship between the components.

Further, as used in this text, the term 'circuitry' refers to any of the following:

(a) hardware-only circuit implementations (such as implementations in only analog and/or digital circuitry)

(b) combinations of circuits and software (and/or firmware), such as: (i) to a combination of processor(s) or (ii) to portions of processor(s)/software (including digital signal processor(s)), software, and memory(ies) that work together to cause an apparatus, such as a mobile phone, to perform various functions) and (c) to circuits, such as a microprocessor(s) or a portion of a microprocessor(s), that re-quire software or firmware for operation, even if the software or firmware is not physically present.

This definition of 'circuitry' applies to all uses of this term in this text, including in any claims. As a further example, as used in this text, the term 'circuitry' also covers an implementation of merely a processor (or multiple processors) or portion of a processor and its (or their) accompanying software and/or firmware. The term 'circuitry' also covers, for example, a baseband integrated circuit or applications processor integrated circuit for a mobile phone.

Any of the processors mentioned in this text, in particular but not limited to processors 10, 20 and 30 of FIGS. 1, 2 and 3, could be a processor of any suitable type. Any processor may comprise but is not limited to one or more microprocessors, one or more processor(s) with accompanying digital signal processor(s), one or more processor(s) without accompanying digital signal processor(s), one or more special-purpose computer chips, one or more field-programmable gate arrays (FPGAS), one or more controllers, one or more application-specific integrated circuits (ASICS), or one or more computer(s). The relevant structure/hardware has been programmed in such a way to carry out the described function.

Moreover, any of the actions described or illustrated herein may be implemented using executable instructions in a general-purpose or special-purpose processor and stored on a computer-readable storage medium (e.g., disk, memory, or the like) to be executed by such a processor. References to 'computer-readable storage medium' should be understood to encompass specialized circuits such as FPGAs, ASICs, signal processing devices, and other devices.

It will be understood that all presented embodiments are only exemplary, and that any feature presented for a particular exemplary embodiment may be used with any aspect of the invention on its own or in combination with any feature presented for the same or another particular exemplary embodiment and/or in combination with any other feature not mentioned. It will further be understood that any feature presented for an example embodiment in a particular category may also be used in a corresponding manner in an example embodiment of any other category.

The invention claimed is:

1. An apparatus comprising at least one processor and at least one memory including computer program code, the at least one memory and the computer program code configured to, with the at least one processor, cause a first apparatus at least to perform:
    holding available encrypted first positioning support data covering a first service area, wherein said encrypted first positioning support data are decryptable by a first decryption key, wherein said encrypted first positioning support data are configured to enable one or more mobile devices receiving said encrypted first positioning support data and having access to said first decryption key to determine their position within the first service area at least partially based on said encrypted first positioning support data decrypted by the first decryption key, wherein said first decryption key is one decryption key of a plurality of decryption keys, wherein at least a second decryption key of said plurality of decryption keys is associated with encrypted second positioning support data covering the first service area, and wherein the encrypted second positioning support data supports positioning of a higher accuracy relative to positioning supported by the encrypted first positioning support data, and wherein the second decryption key is different from the first decryption key; and
    automatically and repeatedly sending or triggering sending said encrypted first positioning support data and said encrypted second positioning support data.

2. The apparatus according to claim 1, wherein said first apparatus is or is part of one of
    a Bluetooth beacon;
    a Bluetooth beacon enabling Bluetooth low energy mode; and
    a Bluetooth low energy beacon.

3. The apparatus according to claim 1, wherein said encrypted first positioning support data are sent in at least one of the following forms:
    in a broadcast;
    as advertising data;
    as advertising data in at least one air interface packet;
    using at least one advertising channel; and
    using at least one advertising channel that is provided for broadcasts.

4. The apparatus according to claim 1, wherein said first positioning support data comprises at least one of:
    data which enable an identification of a transmitter of said encrypted first positioning support data;
    data which enable a determination of one or more characteristics of one or more radio signals;
    data of a radio model for one or more radio signals; and
    data of a radio image for one or more radio signals.

5. The apparatus according to claim 1, wherein the at least one memory and the computer program code are further configured to, with the at least one processor, cause the first apparatus to perform:
    obtaining said first positioning support data, and
    encrypting said first positioning support data using a first encryption key.

6. The apparatus according to claim 1, wherein said encrypted first positioning support data are configured to enable one or more mobile devices receiving said encrypted first positioning support data and having access to said first decryption key to determine their position at least in a first area and/or with a first accuracy.

7. The apparatus according to claim 1 wherein the at least one memory and the computer program code are further configured to, with the at least one processor, cause the first apparatus to perform:

assigning a first encryption key to said first positioning support data and a second encryption key to said second positioning support data.

8. The apparatus according to claim 1, wherein the first apparatus is a beacon or a part thereof.

9. The apparatus of claim 1, wherein the at least two decryption keys of the plurality of decryption keys are each associated with a different group of positioning support data, and wherein the different groups of positioning support data associated with each of the at least two decryption keys differ in at least one of area of accuracy of positioning support.

10. The apparatus of claim 1, wherein enabling one or more mobile devices receiving said encrypted first positioning support data and having access to said first decryption key to determine their position at least partially based on said encrypted first positioning support data decrypted by the first decryption key comprises:

enabling one or more mobile devices to obtain observation information representative of at least one characteristic of at least one signal, wherein the observation information comprises a timing measurement and an angle of arrival; and enabling the one or more mobile devices to determine their position within the first service area at least partially based on said encrypted first positioning support data decrypted by the first decryption key and said observation information representative of at least one characteristic of at least one signal.

11. An apparatus comprising at least one processor and at least one memory including computer program code, the at least one memory and the computer program code configured to, with the at least one processor, cause a mobile device at least to perform:

holding available at least a first decryption key;

receiving encrypted first positioning support data covering a first service area, wherein said encrypted first positioning support data are decryptable by said first decryption key, wherein said encrypted first positioning support data are configured to enable one or more mobile devices receiving said encrypted first positioning support data and having access to said first decryption key to determine their position within the first service area at least partially based on said encrypted first positioning support data decrypted by the first decryption key, and wherein said first decryption key is one decryption key of a plurality of decryption keys;

receiving encrypted second positioning support data covering the second service area, wherein at least a second decryption key of said plurality of decryption keys is associated with encrypted second positioning support data covering the first service area, and wherein the encrypted second positioning support data supports positioning of a higher accuracy relative to positioning supported by the encrypted first positioning support data, and wherein the second decryption key is different from the first decryption key;

obtaining observation information comprising a timing measurement and an angle of arrival;

decrypting said encrypted first positioning support data using said first decryption key; and determining a position of said mobile device at least partially based on said first positioning support data and said observation information.

12. The apparatus according to claim 11, wherein said mobile device comprises at least one of:

a Bluetooth receiver;

a Bluetooth receiver enabling Bluetooth low energy mode; and a Bluetooth low energy receiver.

13. The apparatus according to claim 11, wherein said encrypted first positioning support data are received in at least one of the following forms:

in a broadcast;

as advertising data;

as advertising data in at least one air interface packet;

using at least one advertising channel; and using at least one advertising channel that is provided for broadcasts.

14. The apparatus according to claim 11, wherein said first positioning support data comprises at least one of:

data which enable an identification of a transmitter of said encrypted first positioning support data;

data which enable a determination of one or more characteristics of one or more radio signals;

data of a radio model for one or more radio signals; and data of a radio image for one or more radio signals.

15. The apparatus according to claim 11, wherein said obtained observation information at least is further based on or comprises at least one of:

a received signal strength;

a magnetic field strength and/or direction; and an identification of a transmitter.

16. The apparatus according to claim 11, wherein said obtained observation information is derived from at least one of:

a Global Navigation Satellite System (GNSS);

a Wireless Local Area Network (WLAN) system;

a Bluetooth (BT) system;

a Radio Frequency Identification (RFID) system;

a cellular network system;

one or more sensors; and a manual input.

17. The apparatus according to claim 11, wherein said encrypted first positioning support data are configured to enable one or more mobile devices receiving said encrypted first positioning support data and having access to said first decryption key to determine their position at least in a first area with a first accuracy.

18. The apparatus according to claim 11, wherein said first decryption key is one decryption key of a plurality of decryption keys, and wherein each of said decryption keys is associated with another group of positioning support data.

19. The apparatus according to claim 11, wherein the at least one memory and the computer program code are further configured to, with the at least one processor, cause the mobile device to perform:

decrypting said encrypted second positioning support data using said second decryption key; and determining the position of said mobile device at least partially based on said second positioning support data.

20. The apparatus according to claim 19, wherein the encrypted second positioning support data supports positioning of a higher accuracy relative to positioning supported by the encrypted first positioning support data.

21. The apparatus according to claim 19 wherein the at least one memory and the computer program code are further configured to, with the at least one processor, cause the mobile device to perform:

obtaining said first decryption key and said second decryption key by said mobile device.

22. An apparatus comprising at least one processor and at least one memory including computer program code, the at least one memory and the computer program code configured to, with the at least one processor, cause a server at least to perform:

holding available a plurality of decryption keys;

assigning at least a first decryption key of said plurality of decryption keys to a mobile device, wherein said first decryption key is useable to decrypt encrypted first positioning support data covering a first service area, and wherein said encrypted first positioning support data is configured to enable one or more mobile devices receiving said encrypted first positioning support data and having access to said first decryption key to determine their position within the first service area at least partially based on said encrypted first positioning support data decrypted by the first decryption key, wherein a second decryption key of said plurality of decryption keys is associated with encrypted second positioning support data covering the first service area, wherein the encrypted second positioning support data supports positioning of a higher accuracy relative to positioning supported by the encrypted first positioning support data, and wherein the second decryption key is different than the first decryption key; and providing said first decryption key to said mobile device.

* * * * *